(12) United States Patent
Yu

(10) Patent No.: US 8,056,745 B2
(45) Date of Patent: Nov. 15, 2011

(54) BOTTLE STOPPER HAVING PUSHBUTTON AND MOVABLE PLUG

(75) Inventor: Ji Hyung Yu, Shanghai (CN)

(73) Assignee: Pacific Market International, LLC, Seattle, WA (US)

( * ) Notice: Subject to any disclaimer, the term of this patent is extended or adjusted under 35 U.S.C. 154(b) by 438 days.

(21) Appl. No.: 12/371,486

(22) Filed: Feb. 13, 2009

(65) Prior Publication Data
US 2010/0206835 A1 Aug. 19, 2010

(51) Int. Cl.
*B65D 39/12* (2006.01)
(52) U.S. Cl. .................. 215/359; 215/356; 220/254.3
(58) Field of Classification Search .............. 215/355, 215/356, 358, 359; 220/234, 238, 254.3
See application file for complete search history.

(56) References Cited

U.S. PATENT DOCUMENTS

| | | | | |
|---|---|---|---|---|
| 4,930,657 A * | 6/1990 | Walker | | 220/235 |
| 4,942,970 A * | 7/1990 | Jay | | 215/358 |
| 5,437,387 A * | 8/1995 | Burns | | 220/326 |
| 6,276,545 B1 * | 8/2001 | Ferrari | | 215/293 |
| 6,419,104 B1 * | 7/2002 | Sarajian | | 220/234 |
| 6,763,964 B1 * | 7/2004 | Hurlbut et al. | | 220/254.3 |
| 7,204,383 B2 * | 4/2007 | Hsu | | 220/238 |
| 7,815,067 B2 * | 10/2010 | Matsumoto et al. | | 220/234 |
| 7,850,030 B2 * | 12/2010 | Lin | | 215/361 |
| 2005/0072808 A1 * | 4/2005 | Kitamura | | 222/309 |
| 2006/0016778 A1 * | 1/2006 | Park | | 215/359 |
| 2008/0128320 A1 * | 6/2008 | Woersdoerfer et al. | | 206/769 |
| 2008/0197104 A1 * | 8/2008 | Wang Wu | | 215/355 |

* cited by examiner

*Primary Examiner* — J. Gregory Pickett
*Assistant Examiner* — Ned A Walker
(74) *Attorney, Agent, or Firm* — Davis Wright Tremaine LLP; George C. Rondeau, Jr.

(57) ABSTRACT

A stopper for an opening of a container such as a thermos. The stopper includes a pushbutton, a fluid flow channel extending between an inlet and an outlet, and a movable plug portion positioned adjacent the inlet. A biasing member biases the plug portion into sealing engagement with the inlet thereby preventing the contents of the container from flowing into the channel. A cam follower is disposed upon a cam surface opposing the biasing member. The cam follower is rotatable by the pushbutton relative to the cam surface from a closed position to an open position and when so rotated, exerts a biasing force on the cam surface sufficient to overcome the biasing force exerted by the biasing member on the plug portion and space the plug portion from the inlet allowing the contents of the container to flow into the channel and out the outlet.

26 Claims, 14 Drawing Sheets

BOTTLE STOPPER HAVING PUSHBUTTON AND MOVABLE PLUG

BACKGROUND OF THE INVENTION

1. Field of the Invention

The present invention is directed generally to a stopper used with a food or beverage container and more particularly to a stopper used with a thermos configured to open and close without being removed from the thermos.

2. Description of the Related Art

Many people use thermoses to carry liquids, such as coffee, soup, hot chocolate, and like, with them on trips and to work. Conventional thermoses have a threaded removable stopper affixed to their open top portions. To access the contents of the thermos, the stopper must be removed. However, this is not always practical particularly at a work sites where a stopper can become lost or must be set down in an unhygienic location. Thus, a need exists for a thermos stopper that opens (without being removed from the thermos) to allow the contents of the thermos to poured out into a cup or other container. It would be desirable to disassemble such a thermos stopper between uses to clean its internal components, which would be exposed to the contents of the thermos. The present application provides these and other advantages as will be apparent from the following detailed description and accompanying figures.

BRIEF DESCRIPTION OF THE SEVERAL VIEWS OF THE DRAWING(S)

Figure 1:
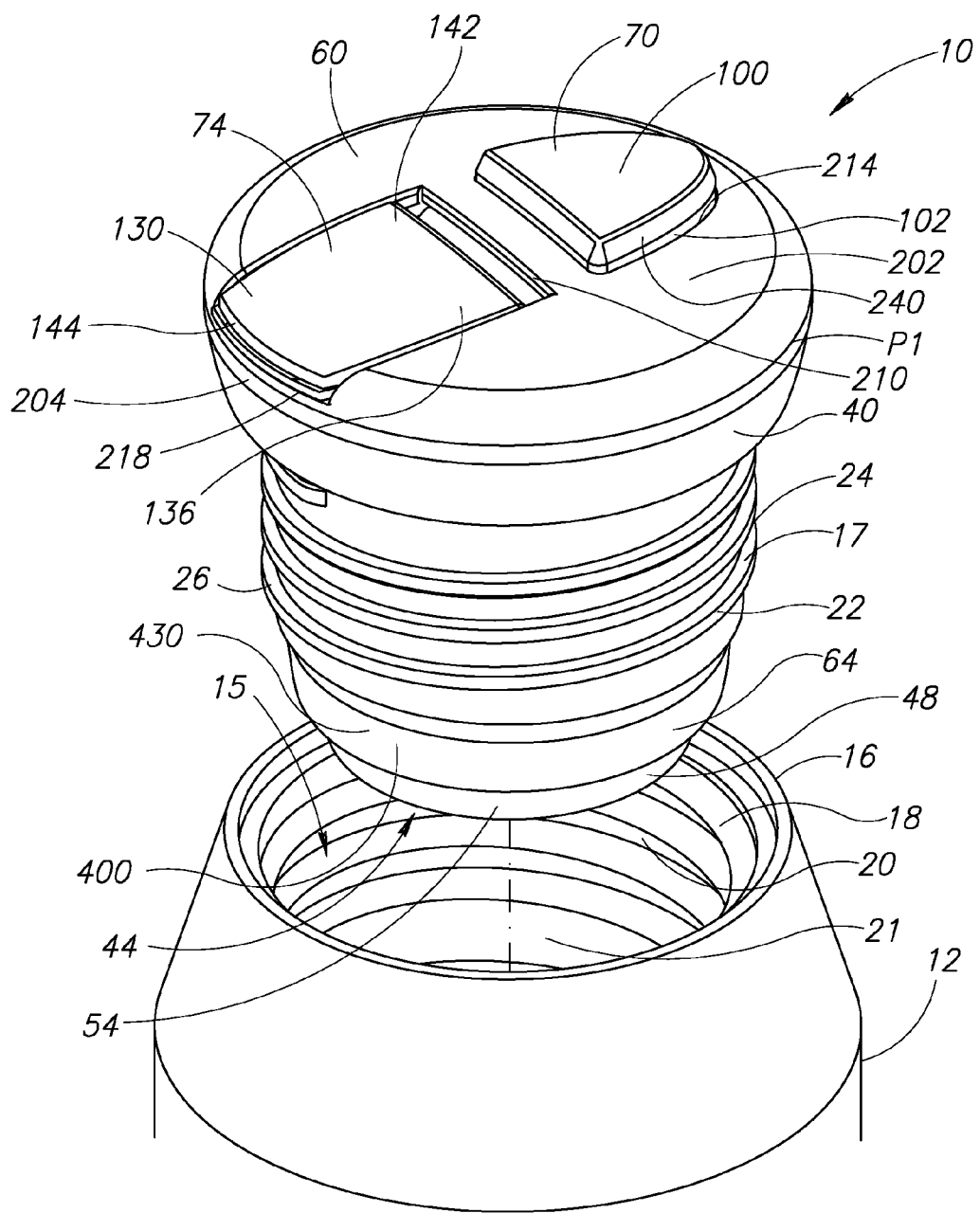
FIG. 1 is a perspective view of a stopper constructed in accordance with the present invention depicted in a closed configuration and above a beverage or food container.
Figure 12:
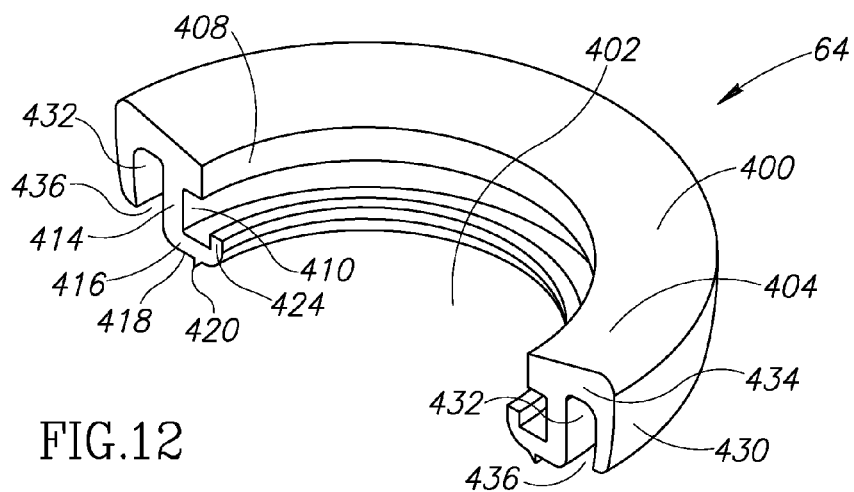

FIG. 12 a perspective cross-sectional view of an annular seal of the stopper of FIG. 1.

Figure 13:
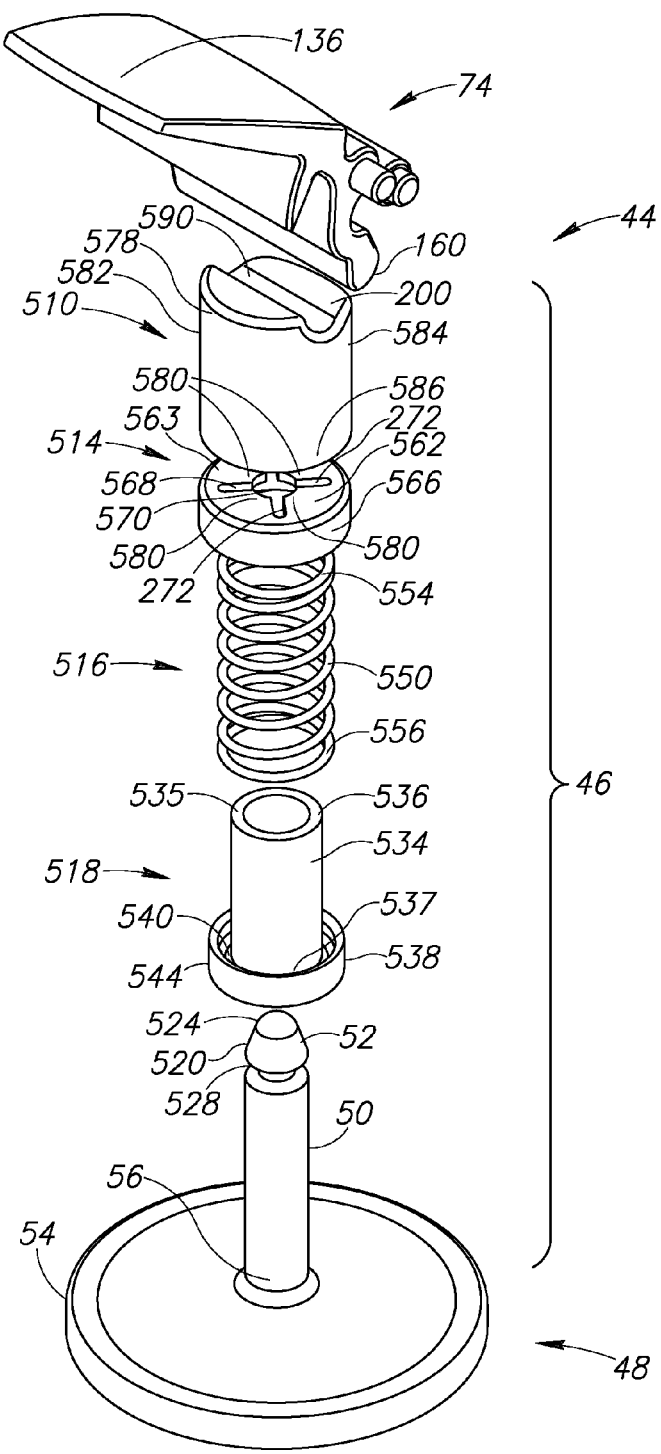

FIG. 13 a perspective view of the valve assembly of the stopper of FIG. 1.

Figure 14:
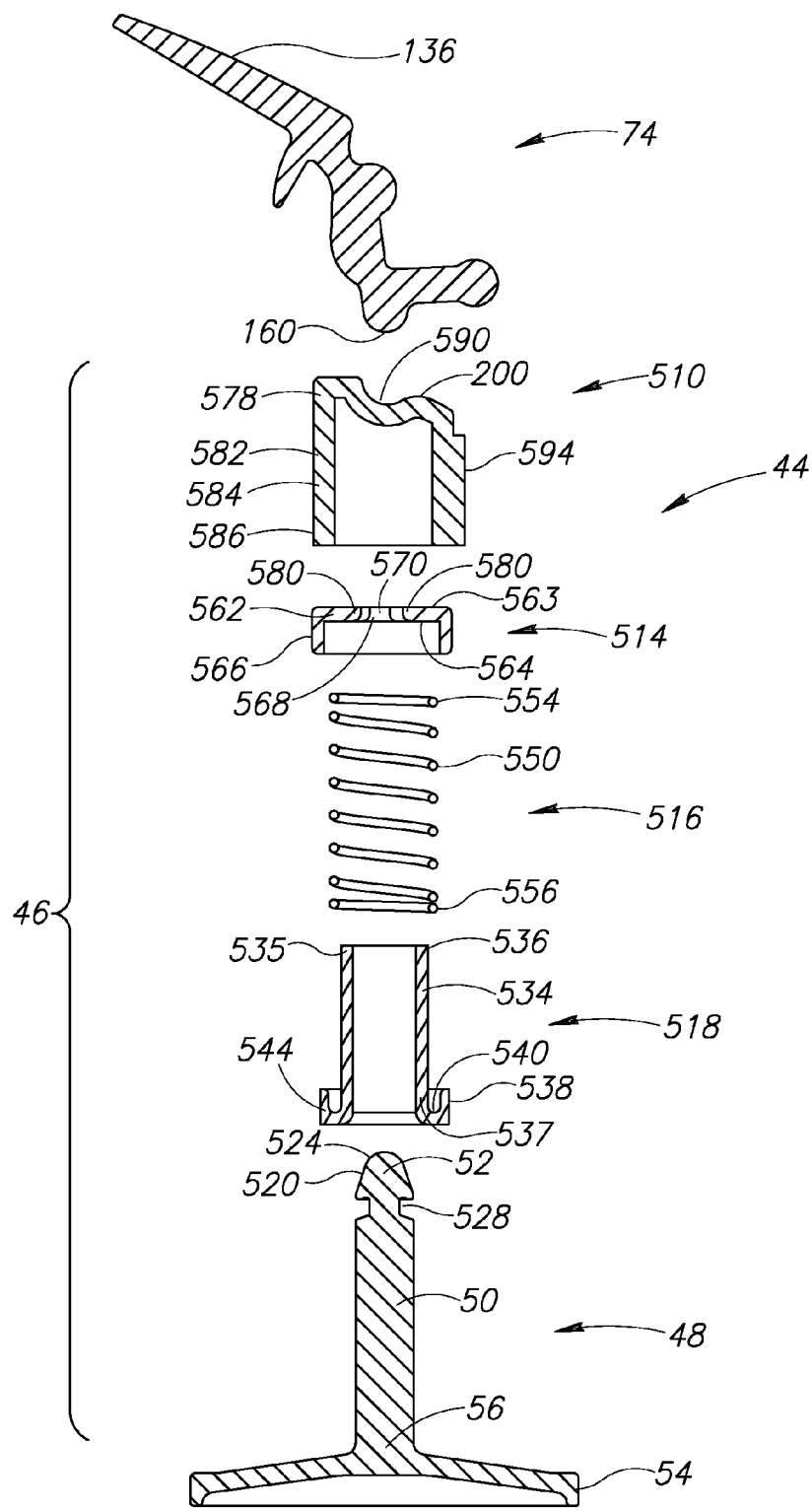

FIG. 14 a cross-sectional view of the valve assembly of FIG. 13.

Figure 8:
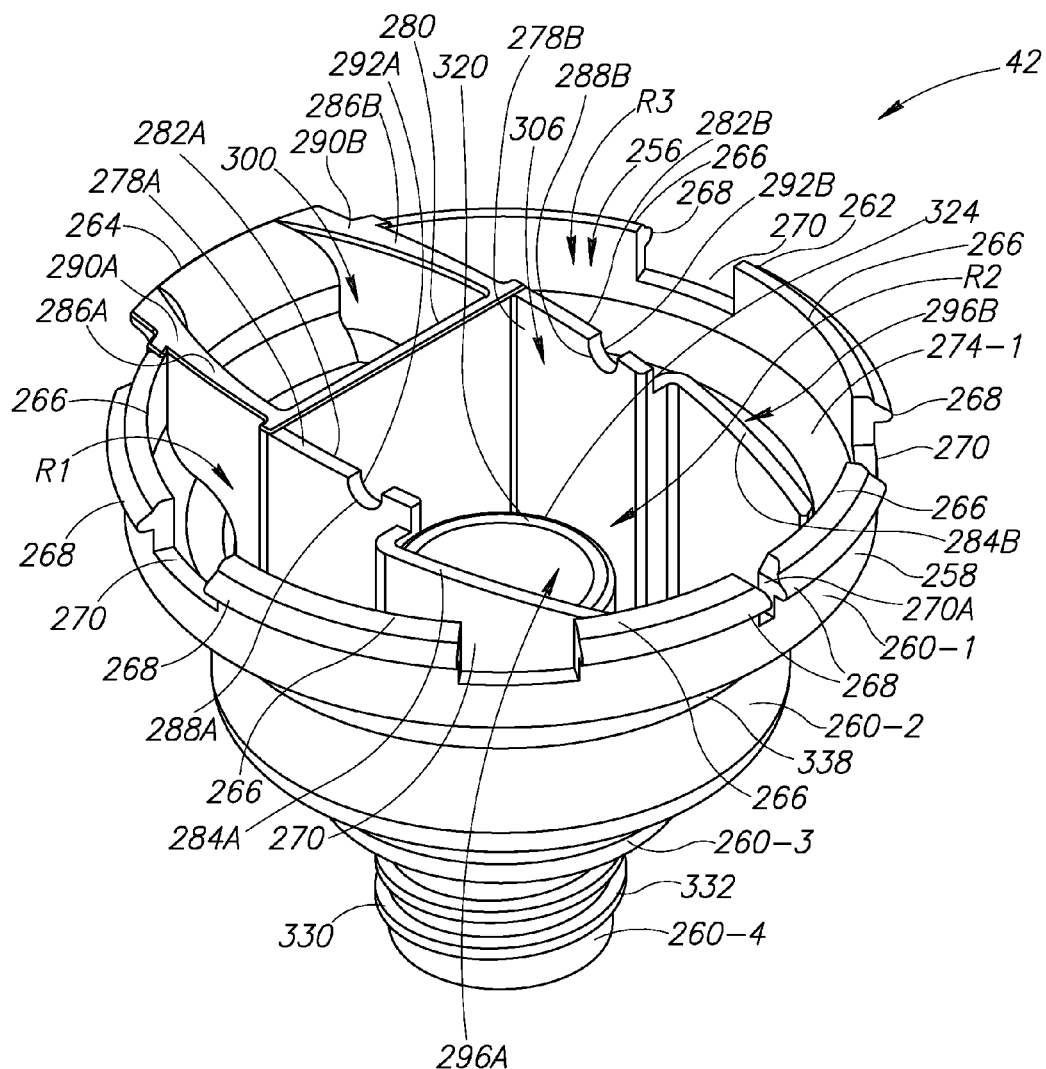
FIG. 8 is a perspective view of an inner body of the stopper of FIG. 1 depicting its a pour spout.
Figure 15:
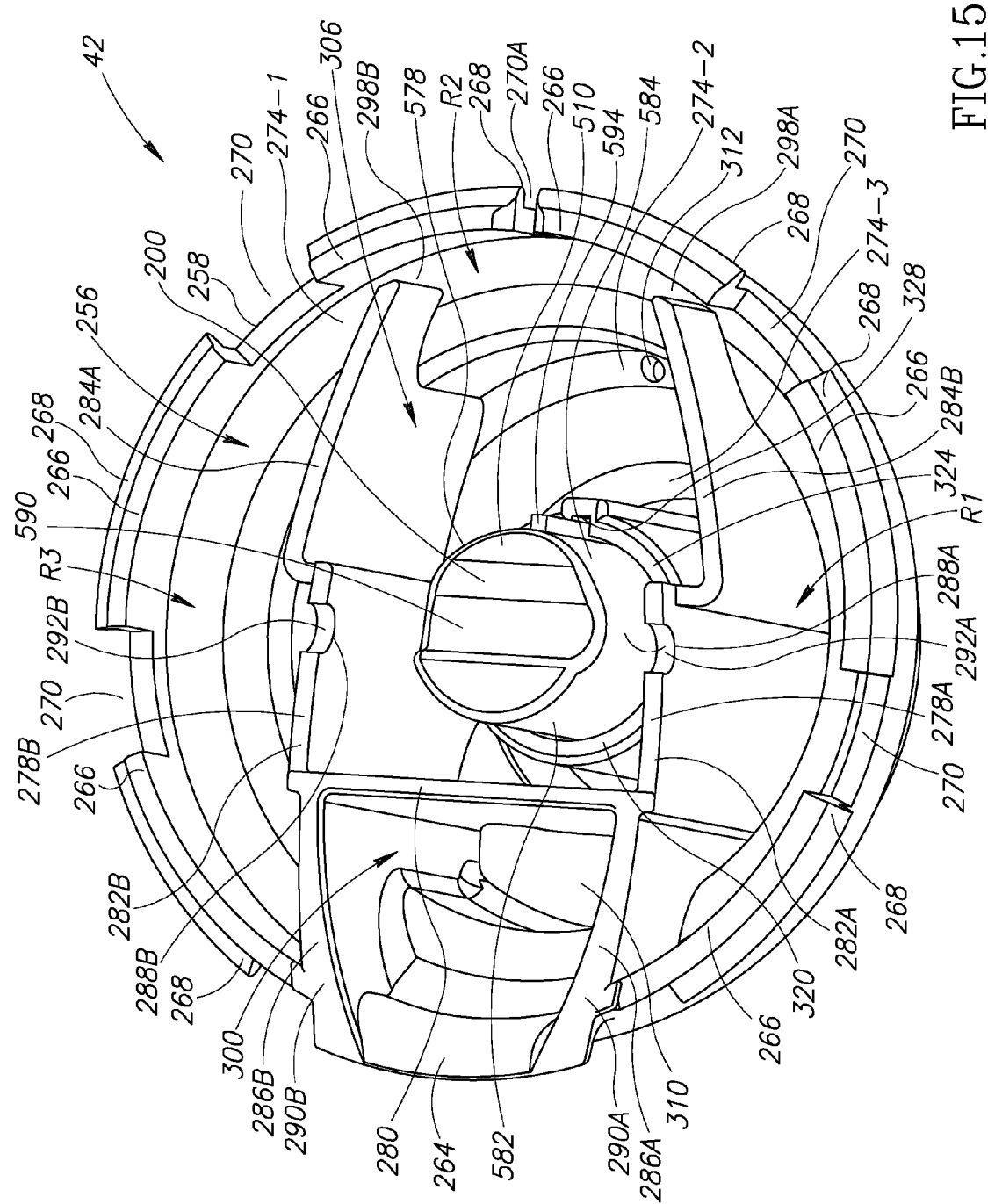

FIG. 15 is a perspective view a subassembly of the inner body of FIG. 8 and the link member of the valve assembly of FIG. 13.

DETAILED DESCRIPTION OF THE INVENTION

Overview

Figure 2:
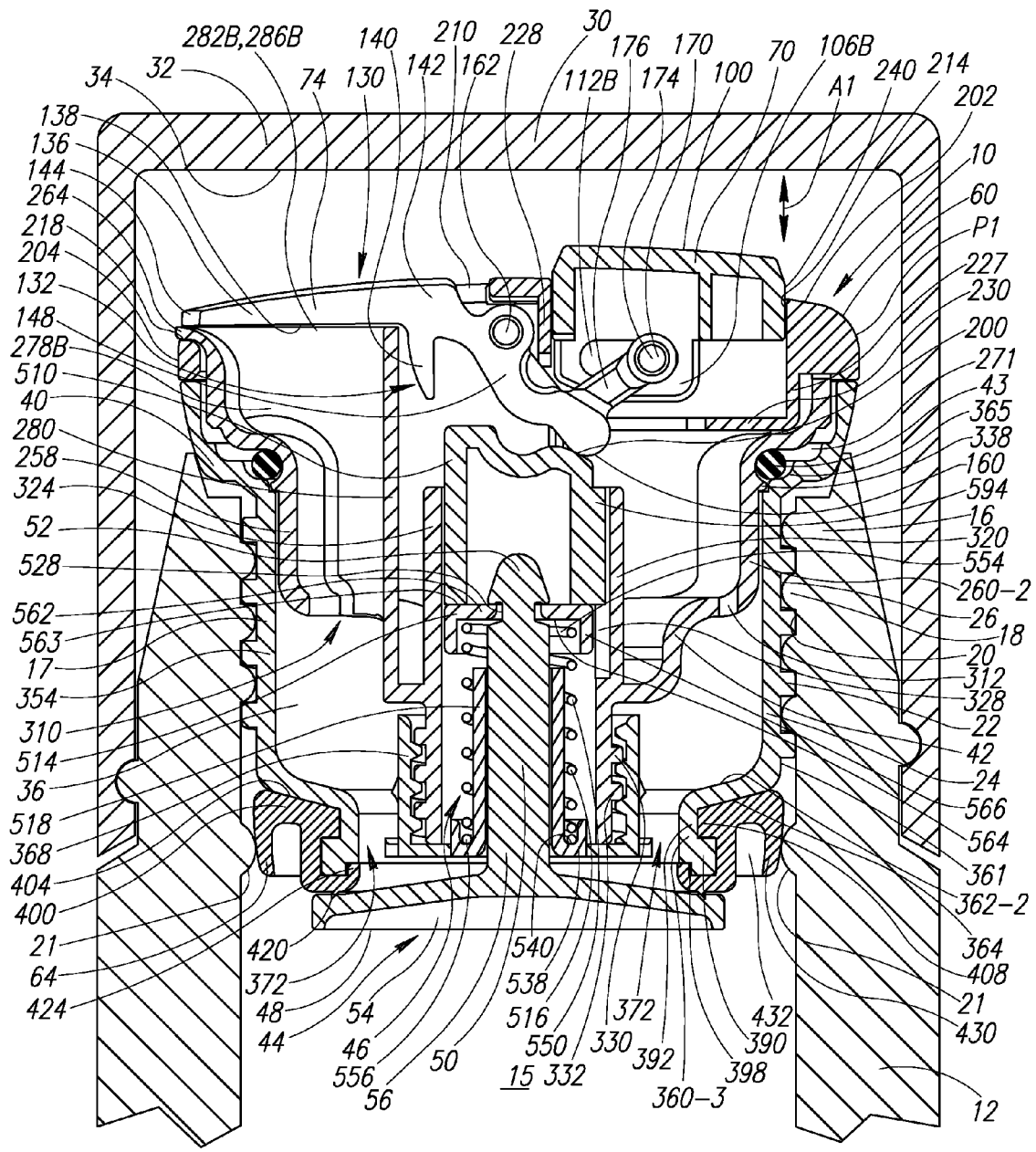
FIG. 2 is a cross-sectional view of the stopper of FIG. 1 in the closed configuration positioned within an inside portion of a rim portion of the container with a cup coupled to an outside portion of the rim portion of the container and covering the stopper.

Referring to FIGS. 1 and 2, aspects of the present invention include a stopper 10 for a beverage or food container 12, such as a bottle, thermos, decanter, or similar storage vessel. The container 12 may be reusable or disposable. Likewise, the stopper 10 may be constructed to be either reusable or disposable. For ease of illustration, the stopper 10 is depicted and described as being coupled to the container 12, which is positioned in an upright orientation. However, those of ordinary skill in the art appreciate that during use, the stopper 10 and the container 12 may be positioned in any orientation. Therefore, terms that relate to directions, such as top, bottom, upward, downward, and the like, have been assigned arbitrarily and are not intended to limit the invention.

Figure 3:
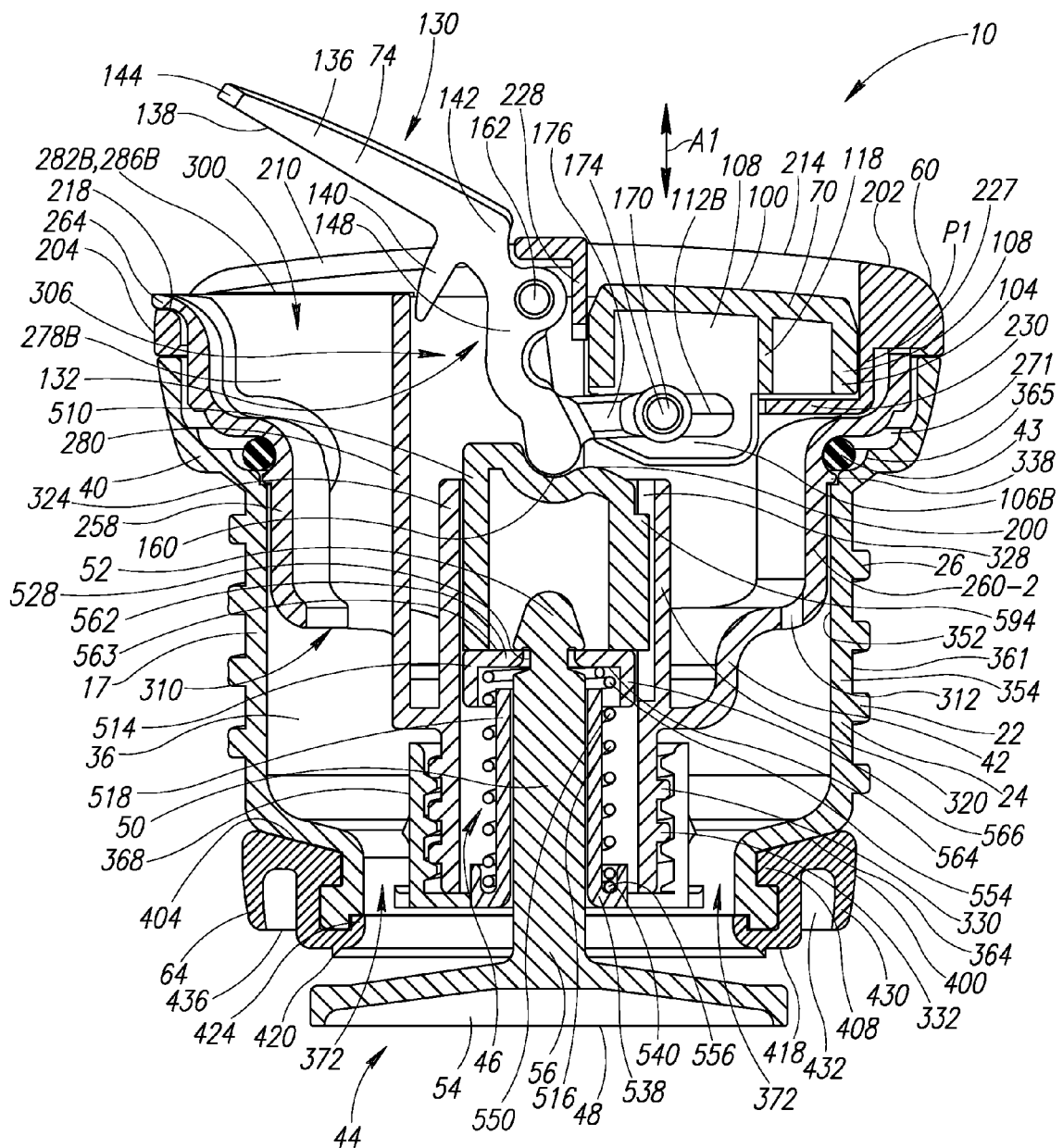
FIG. 3 is a cross-sectional view of the stopper of FIG. 1 depicted in an open configuration.

The stopper 10 may be selectively transitioned by a user between a closed configuration (illustrated in FIGS. 1 and 2) and an open configuration (illustrated in FIG. 3). Thus, the stopper 10 may be selectively opened and closed by a user. The container 12 has a hollow interior portion 15 for storing liquid or semi-liquid contents. Non-limiting examples of liquid or semi-liquid contents stored by the container include beverages, soups, and the like. When the stopper 10 is opened, the contents residing in the interior portion 15 of the container 12 may flow therefrom through the stopper 10. When the stopper 10 is closed, the contents residing in the interior portion 15 of the container 12 are sealed therein by the stopper 10.

The stopper 10 is configured to be attached to a rim portion 16 of the container 12 by a connector portion 17. In the embodiment depicted in the figures, the rim portion 16 has threads 18 formed on its inside surface 20. The rim portion 16 also includes an inwardly extending sealing member 21 located below the threads 18. The connector portion 17 of the stopper 10 includes outside threads 22 disposed about a lower portion 24 of an outer surface 26 of an outer body 40 of the stopper 10. The threads 22 of the connector portion 17 are configured to threadedly engage the threads 18 of the rim portion 16 for removable engagement therewith.

As illustrated in FIG. 2, when the container 12 is implemented as a thermos, an inverted cup 30, mug, bowl, and the like may be coupled to the rim portion 16 of the container 12 over the stopper 10. In this manner, the stopper 10 is housed inside the inverted cup 30, which must first be removed before the stopper 10 can be selectively opened by the user. The inverted cup 30 has a bottom portion 32 with an inside surface 34 spaced from an upper end of the stopper 10.

The stopper 10 has an interior portion 36 defined at least in part by the outer body 40. The stopper 10 also includes an inner body 42 nested inside the outer body 40, an annular sealing member 43 (e.g., an o-ring) sandwiched between the outer and inner bodies 40 and 42 and forming a liquid tight seal therebetween, and a valve assembly 44 having internal components 46 disposed inside the interior portion 36 of the outer body 40, and a valve member 48 having a shaft portion 50 and a plug portion 54 external to the outer body 40. The shaft portion 50 having a proximal end 52 engaging the internal components 46 of the valve assembly 44 and a distal end 56 coupled to the plug portion 54 external to the outer body 40.

The stopper 10 also includes a top cover 60 coupled to the inner body 40 and covering both the outer and inner bodies 40 and 42. The stopper 10 also has an annular seal 64 disposed between the plug portion 54 of the valve member 48 and the outer body 40. The annular seal 64 forms a liquid tight seal between the plug portion 54 of the valve member 48 and the outer body 40 when the stopper 10 is in the closed configuration (illustrated in FIGS. 1 and 2). When the stopper 10 is in the open configuration (illustrated in FIG. 3), the plug portion 54 of the valve member 48 is spaced from the annular seal 64 to permit the flow of the contents of the container 12 into and out of the interior portion 36 of the stopper 10. The annular seal 64 also engages (and may be compressed by) the inwardly extending sealing member 21 to form a liquid tight seal between the stopper 10 and the rim portion 16 of the container 12.

The valve assembly 44 is actuated by an externally accessible and manually operated pushbutton 70 coupled to an elongated lever member 74 pivotally mounted to the inner body 42. The lever member 74 pivots between an open position (illustrated in FIG. 3) in which the stopper 10 is open and the contents of the container 12 may exit therefrom through the stopper 10 and a closed position (illustrated in FIGS. 1 and 2) in which the stopper 10 is closed and the contents of the container 12 are retained inside the container 12 by the stopper 10.

Figure 4:
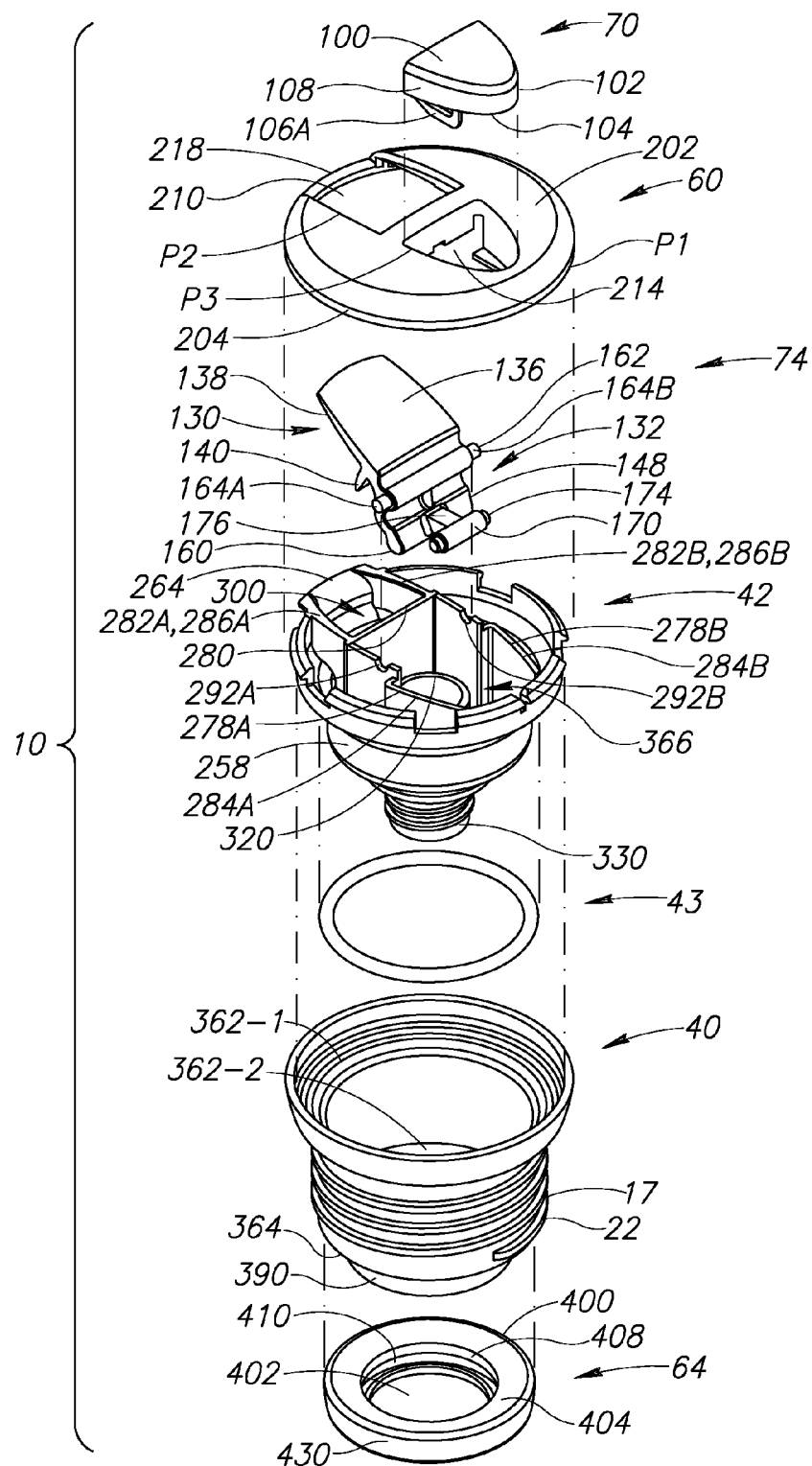
FIG. 4 is an exploded perspective view of the stopper of FIG. 1 omitting the components of its valve assembly.

FIG. 4 provides an exploded view of the components of the stopper 10. For illustrative purposes, the components of the valve assembly 44 are omitted from FIG. 4. Exploded view of the components of the valve assembly 44 (illustrated with the lever member 74) are provided in FIGS. 13 and 14. Each of the components illustrated in FIG. 4 are described in the following sections.

Pushbutton

The pushbutton 70 is selectively positionable in both a depressed, open position (see FIG. 3) and a raised, closed position (see FIGS. 1 and 2). The pushbutton 70 travels been the open and closed positions along a substantially linearly path of travel along a travel direction (identified by double headed arrow "A1" in FIGS. 2 and 3) relative to the top cover 60.

Figure 5:
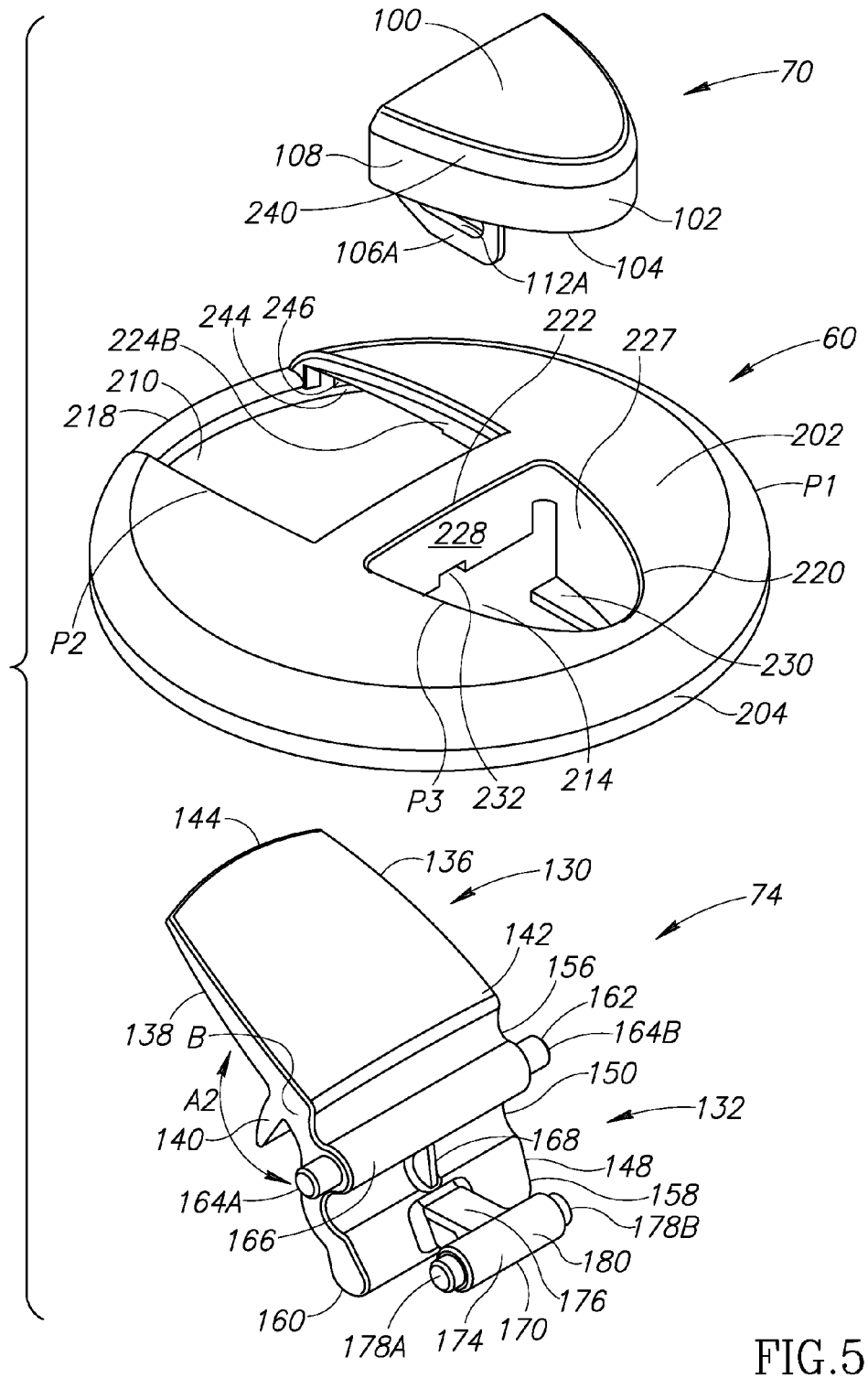
FIG. 5 is an exploded perspective view of the stopper of FIG. 1 depicting a pushbutton, a top cover, and a lever member.
Figure 6:
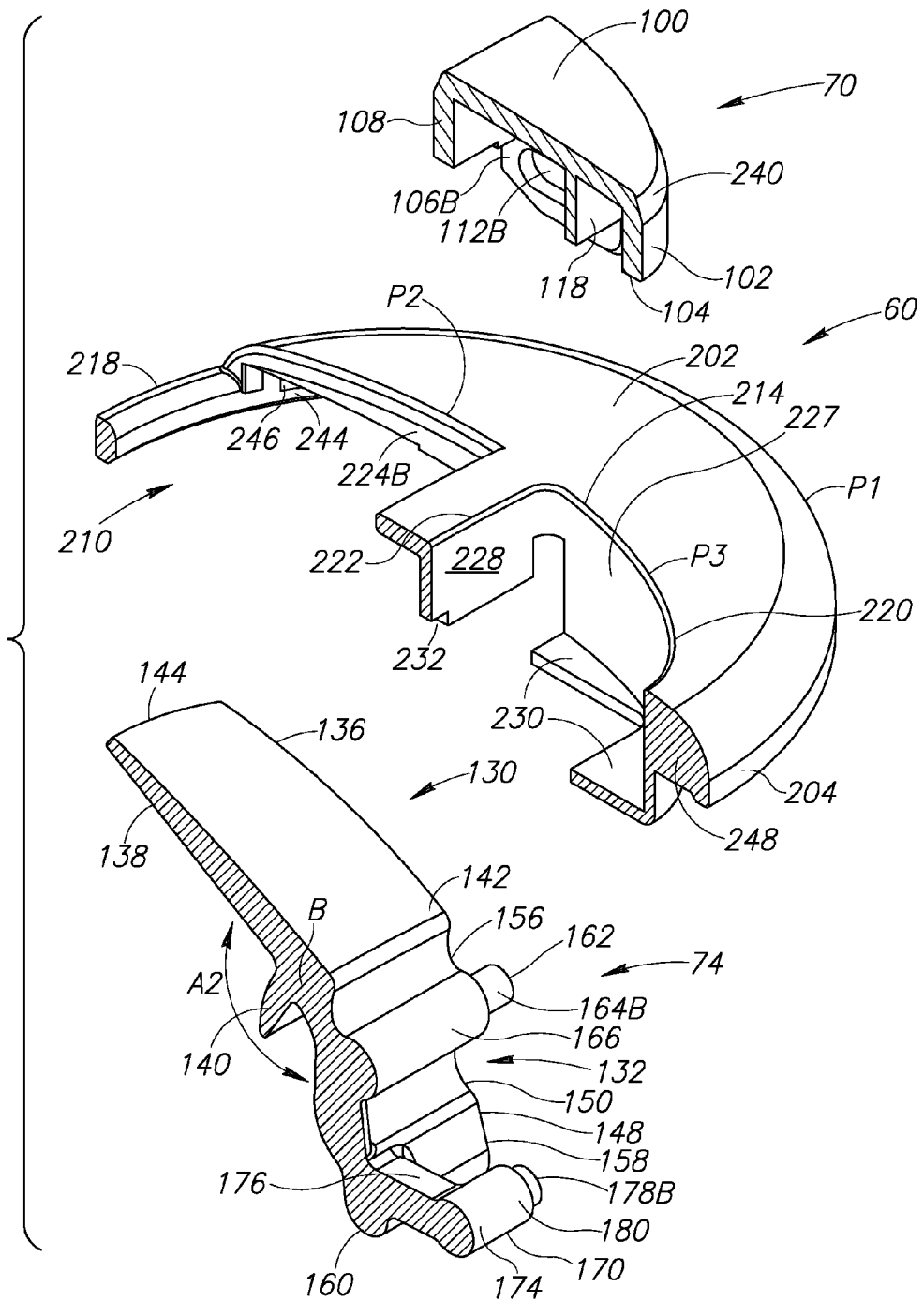
FIG. 6 is a cross-sectional view of the pushbutton, the top cover, and the lever member of FIG. 5.

Referring to FIGS. 5 and 6, the pushbutton 70 has a top portion 100 against which the user pushes to pivot the lever member 74, a side portion 102 extending downwardly from the top portion 100, a bottom portion 104 opposite the top portion 100, and a pair of spaced apart downwardly extending connector portions 106A and 106B disposed along the bottom portion 104.

In the embodiment illustrated, the side portion 102 is implemented as a single continuation sidewall 108. However, this is not a requirement, and embodiments in which the side portion 102 includes two or more connected or disconnected sidewalls (not shown) are also within the scope of the present teachings.

The connector portions 106A and 106B couple the pushbutton 70 to the lever member 74. The connector portion 106A includes a slot 112A and connector portion 106B includes a slot 112B. The slots 112A and 112B are spaced apart and juxtaposed with one another. The slots 112A and 112B each extend in a direction substantially orthogonal to the direction of travel (identified by double headed arrow "A1" in FIGS. 2 and 3) of the pushbutton 70 relative to the top cover 60 when the pushbutton is depressed by the user to open the stopper 10.

Optionally, the pushbutton 70 includes one or more internal support members. In the embodiment illustrated, the pushbutton 70 includes a transverse support member 118 extending under the top portion 100 and between opposite portions of the continuation sidewall 108.

Lever Member

The lever member 74 is selectively positionable in both an open position (see FIG. 3) and a closed position (see FIGS. 1 and 2) by the pushbutton 70. The lever member 74 has an external portion 130 and an internal portion 132. The lever member 74 has a bent shape with an inside angle "A2" defined between the external portion 130 and the internal portion 132. The angle "A2" has an apex "B" at the intersection of the external and internal portions 130 and 132.

When assembled inside the stopper 10, the external portion 130 is accessible from outside the stopper 10 and the internal portion 132 is disposed inside the stopper. The external portion 130 includes a tapered flap portion 136 having an underside 138 with a guide follower portion 140, a proximal portion 142 adjacent the internal portion 132 and a distal portion 144 opposite the proximal portion. The flap portion 136 may be tapered so that its thickest portion is along its proximal portion 142 and its thinnest portion is along its distal portion 144.

Referring to FIG. 2, the guide follower portion 140 extends downwardly from the underside 138 of the flap portion 136 toward the inner body 42 of the stopper 10 and is not exposed when the lever member 74 is in the closed position. However, as may be viewed in FIG. 3, the guide follower portion 140 may be at least partially visible to the user when the lever member 74 is in the open position. The guide follower portion 140 may help orient the lever member 74 relative to the top cover 60 and may help guide the lever member 74 relative to the inner body 42 when the lever member 74 is transitioned between the open and closed positions. In the embodiment illustrated in FIGS. 5 and 6, the guide follower portion 140 is implemented as a continuous wall curved along both its length and height. Further, the guide follower portion 140 is located adjacent to the apex "B" of the angle "A2."

The internal portion 132 includes a support platform 148 having a curved intermediate portion 150 flanked by a curved proximal edge portion 156 coupled to the external portion 130, and a free distal edge portion 158 opposite the proximal edge portion 156 and terminated by a rounded cam follower portion 160. The internal portion 132 also includes a transverse pivot pin 162 coupled to the support platform 148 between the curved proximal edge portion 156 and the curved intermediate portion 150. The transverse pivot pin 162 has a first end portion 164A opposite a second end portion 164B. The transverse pivot pin 162 is spaced from the apex "B" of the angle "A2" toward the free distal edge portion 158. The transverse pivot pin 162 includes an intermediate portion 166 located between the first and second end portions 164A and 164B. Optionally, the intermediate portion 166 may have a larger diameter than the first and second end portions 164A and 164B. Optionally, the internal portion 132 includes a support member 168 coupled to the curved intermediate portion 150 and positioned to provide lateral support to the transverse pivot pin 162.

The internal portion 132 also includes a connector portion 170 coupled to the free distal edge portion 158 of the support platform 148. The connector portion 170 includes an elongated transverse pivot pin 174 coupled to the support platform 148 by a support member 176. In the embodiment illustrated, the transverse pivot pin 174 is shorter in length than the transverse pivot pin 162. When the stopper 10 is assembled, the connector portion 170 of the lever member 74 is movably coupled to the connector portions 106A and 106B of the pushbutton 70. The transverse pivot pin 174 has a first end portion 178A configured to be received inside the slot 112A of the connector portion 106A and a second end portion 178B configured to be received inside the slot 112B of the connector portion 106B. The transverse pivot pin 174 includes an intermediate portion 180 between the first and second end portions 178A and 178B. The intermediate portion 180 may be configured to be too large to be received inside the slots 112A and 112B to limit the lateral movement to of the lever member 74 relative to the pushbutton 70. Thus, when the stopper 10 is assembled, the intermediate portion 180 of the transverse pivot pin 174 is flanked by the connector portions 106A and 106B of the pushbutton 70.

The transverse pivot pin 174 pivots and slides longitudinally within the spaced apart slots 112A and 112B when the lever member 74 is moved between the open and closed positions. The support member 176 is configured to adequately space the transverse pivot pin 174 from the support platform 148 to permit the transverse pivot pin 174 to pivot within the spaced apart slots 112A and 112B without the occurrence of undesirable engagement between the sidewall 108 of the pushbutton 70 and the support platform 148 of the lever member 74.

When the pushbutton 70 is depressed, the lever member 74 pivots on the transverse pivot pin 162 pressing the cam follower portion 160 of the lever member 74 against a cam surface 200 (illustrated in FIGS. 2 and 3 and described below) of the valve assembly 44 thereby actuating the valve assembly 44 causing it to open. At the same time, the flap portion 136 is rotated upwardly away from the top cover 60, opening the stopper 10. When the valve assembly 44 is open and the flap portion 136 is rotated upwardly away from the top cover 60, the contents of the container 12 may flow through the stopper 10.

Top Cover

The top cover 60 is generally disk shaped and has a downwardly curving upper surface 202 with a generally circular perimeter portion "P1" and a downwardly extending sidewall 204 extending circumferentially about the upper surface 202 and along the perimeter portion "P1." A first aperture 210 is formed in the upper surface 202 through which the contents of the container 12 may flow when the lever member 74 is in the open position (see FIG. 3). A second aperture 214 spaced apart from the first aperture 210 is formed in the upper surface 202. The second aperture 214 is configured to receive the pushbutton 70 and permit it to be depressed by the user for the purposes of pivoting the lever member 74 into the open position.

The first and second apertures 210 and 214 each have a perimeter portion "P2" and "P3," respectively. The perimeter portion "P2" of the first aperture 210 has a relieved portion 218 adjacent the perimeter portion "P1" of the upper surface 202. In the embodiment illustrated, the perimeter portion "P2" of the second aperture 214 has a curved portion 220 opposite a substantially linear portion 222.

Figure 7:
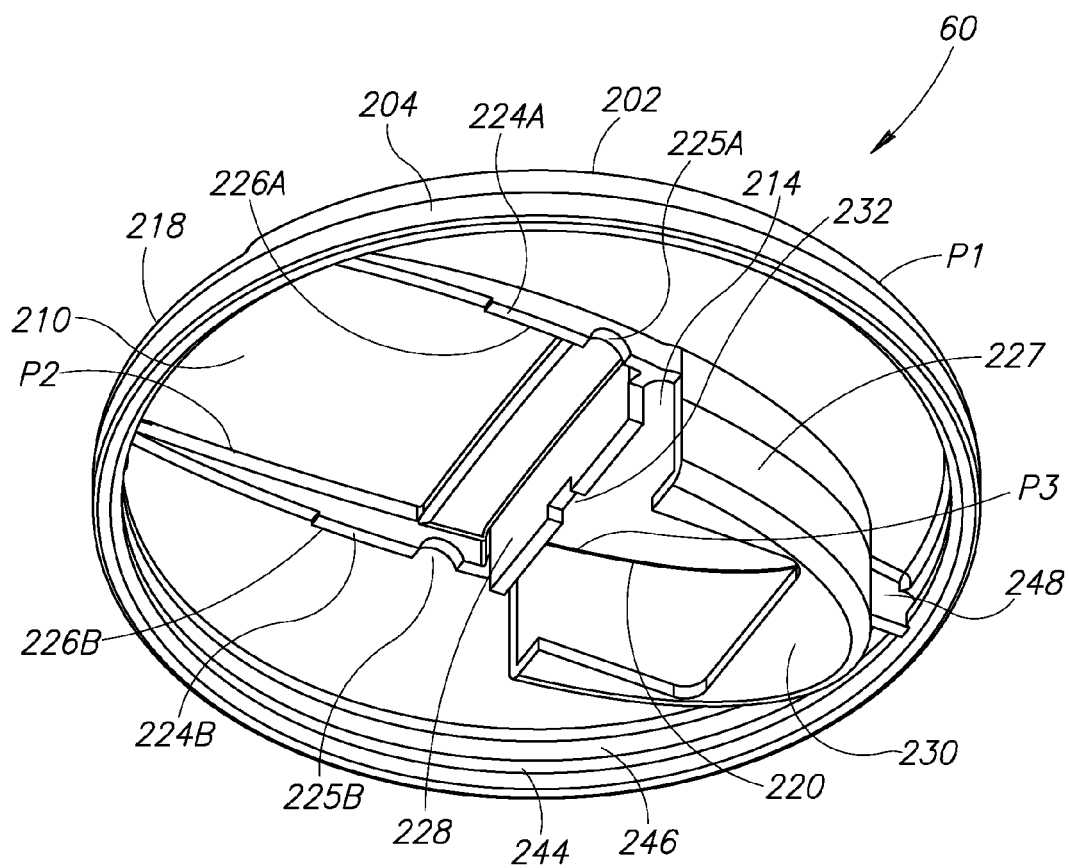
FIG. 7 is a perspective view of the underside of the top cover of FIG. 5.

Referring to FIG. 7, a pair of inwardly extending guide walls 224A and 224B are positioned opposite one another along the perimeter portion "P2" of the first aperture 210. The guide wall 224A has a notch 225A formed along its distal edge 226A and the guide wall 224B has a notch 225B formed along its distal edge 226B juxtaposed with the notch 225A across the first aperture 210. The notches 225A and 225B are disposed to receive a portion of the first and second end portions 164A and 164B, respectively, of the transverse pivot pin 162 of the lever member 74 therein, when the stopper 10 is assembled. In this manner, the notches 225A and 225B help maintain the proper positioning of the lever member 74 relative to the top cover 60 and the inner body 42 (see FIG. 4).

The top cover 60 also has an inwardly extending first guide wall portion 227 and a second guide wall portion 228, each adjacent to at least a portion of the perimeter portion "P3" of the second aperture 214. In the embodiment illustrated, the first guide wall portion 227 is curved about the curved portion 220 of the perimeter portion "P3" of the second aperture 214 and the second guide wall portion 228 is substantially linear extending along the substantially linear portion 222 (see FIGS. 5 and 6) of the perimeter portion "P3" of the second aperture 214.

Turning to FIG. 2, when the pushbutton 70 is received inside the second aperture 214, the side portion 102 of the pushbutton 70 is adjacent the first and second guide wall portions 227 and 228. The first guide wall portion 227, and the second guide wall portion 228 help guide the pushbutton 70 as it is transitioned between the open and closed positions limiting the lateral movement of the pushbutton laterally relative to the top cover 60 and the internal structures of the stopper 10. The first guide wall portion 227 terminates in a shelf portion 230. Referring to FIG. 3, when the pushbutton 70 is in the open position, a portion of the sidewall 108 adjacent the bottom portion 104 of the pushbutton 70 rests upon the shelf portion 230, which limits the inward path of travel of the pushbutton 70.

Returning to FIGS. 5 and 6, the second guide wall portion 228 includes a central notch 232 along its lower edge 234. The central notch 232 is configured to allow the support member 168 of the connector portion 170 of the lever member 74 to pass into and out of the central notch 232 as the lever member 74 is pivoted into and out of the open position to prevent interference between the second guide wall portion 228 and the lever member 74.

When the lever member 74 is in the closed position (see FIGS. 1 and 2), the flap portion 136 of the lever member 74 is received inside the first aperture 210 in the top cover 60 and closes the first aperture 210, with the distal portion 144 of the flap portion 136 being located adjacent to the relieved portion 218 of the perimeter portion "P2" of the first aperture 210. The internal portion 132 of the lever member 74 extends away from the first aperture 210 and toward the inner body 42 with the transverse pivot pin 162 resting on and being supported by the inner body 42 (see FIG. 2) inside the stopper 10.

Referring to FIGS. 1 and 2, when the lever member 74 is in the closed position, the top surface 100 of the pushbutton 70 and an exposed portion 240 of the side portion 102 extend upwardly from the upper surface 202 of the top cover 60 through the second aperture 214. Below the second aperture 214, the connector portions 106A and 106B of the pushbutton 70 are coupled to the connector portion 170 of the lever member 74.

Referring to FIG. 3, when the lever member 74 is in the open position, the flap portion 136 of the lever member 74 is spaced upwardly from the relieved portion 218 of the first aperture 210, and the top surface 100 of the pushbutton 70 is recessed below the upper surface 202 of the top cover 60. Thus, the previously exposed portion 240 (see FIGS. 1 and 2) of the side portion 102 of the pushbutton 70 is hidden below the top cover 60.

The lever member 74 and the pushbutton 70 are transitioned from the open position to the closed position by pressing the lever member 74 toward the top cover 60. The lever member 74 may be pressed into the closed position by the user, or the inverted cup 30 (see FIG. 2) when the inverted cup is attached to the rim portion 16 of the container 12 over the stopper 10. Specifically, if the lever member 74 is in the open position, when the inverted cup 30 is attached to the rim portion 16 of the container 12 over the stopper 10, the inside surface 34 of the bottom portion 32 of the inverted cup 30 will bear against the distal portion 144 of the flap portion 136 pressing it toward the top cover 60 and causing it to transition into the closed position.

Turning to FIG. 7, the downwardly extending sidewall 204 along the perimeter portion "P1" of the top cover 60 has an inwardly extending projection 244 defining a channel 246 below the upper surface 202. The projection 244 and the channel 246 are configured to removably couple the top cover 60 to the inner body 42 (see FIGS. 2-4). In the embodiment illustrated, a radially extending guide member 248 extends between the first guide wall portion 227 and the downwardly extending sidewall 204.

Inner Body

Figure 9:
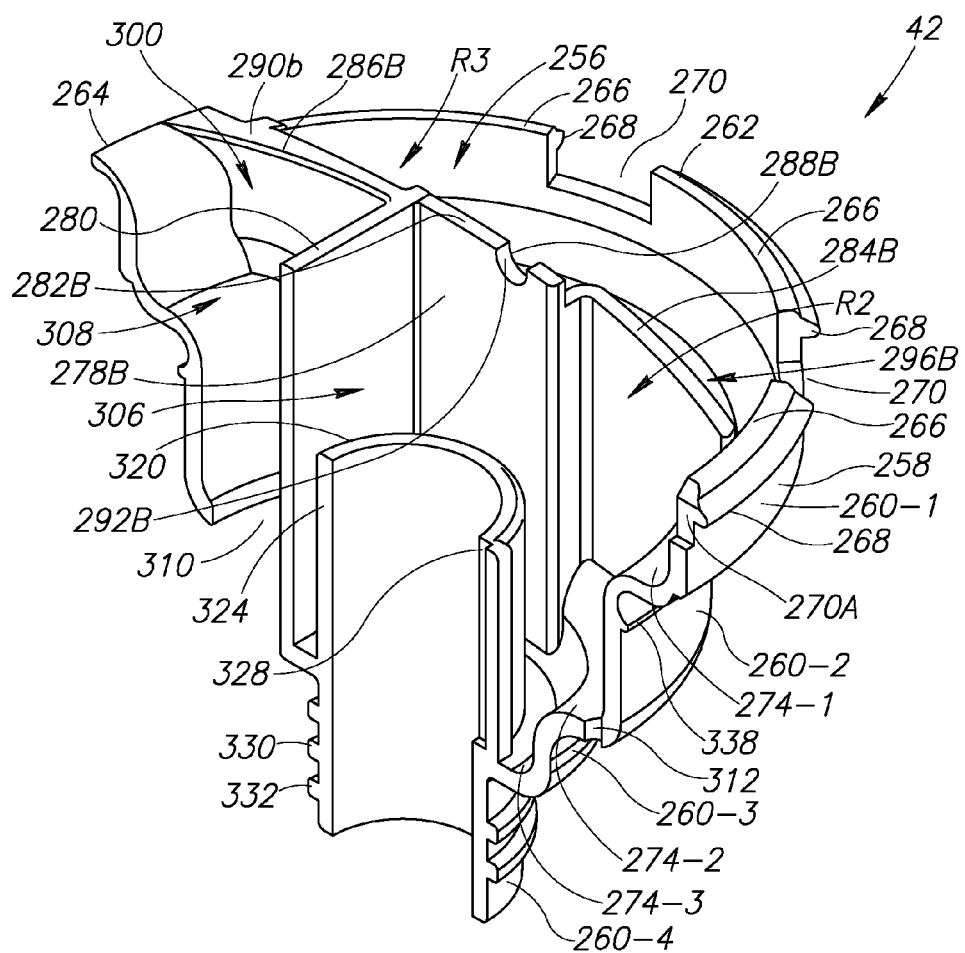
FIG. 9 is a cross-sectional view of the inner body of FIG. 8.

Referring to FIGS. 8 and 9, the inner body 42 has an interior portion 256 housing various component of the valve assembly 44 (see FIGS. 13 and 14) and through which the contents of the container 12 (see FIGS. 1 and 2) flow when the stopper 10 (see FIGS. 1-3) is in the open configuration (illustrated in FIG. 3). The interior portion 256 is defined by an outer wall 258 having four segments: a top segment 260-1, a first middle segment 260-2, a second middle segment 260-3, and a bottom segment 260-4. The four segments 260-1, 260-2, 260-3, and 260-4 each have a generally circular cross-sectional shape with diameters that decrease from section 260-1 to section 260-4.

The top segment 260-1 includes an upper portion 262 having an outwardly extending pour spout 264. When the stopper 10 is assembled, the sidewall 204 (see FIGS. 5 and 6) of the top cover 60 (see FIGS. 5 and 6) is coupled to the upper portion 262 of the top segment 260-1 of the inner body 42, with the relieved portion 218 (see FIGS. 2 and 3) being located adjacent to the pour spout 264. As may be viewed in FIGS. 2 and 3, the pour spout 264 extends upwardly and outwardly through the first aperture 210 when the top cover 60 is coupled to the inner body 42.

The upper portion 262 of the top segment 260-1 has a plurality of upwardly extending spaced apart fingers 266 each having an outwardly and radially extending projection 268. Interstices 270 are defined between adjacent fingers 266. The fingers 266 flex inwardly to allow the radially extending projections 268 to pass over the inwardly extending projection 244 (see FIG. 6) of the top cover 60. After passing over the inwardly extending projection 244, the fingers 266 bias the projections 268 outwardly radially into the channel 246 (see FIG. 6) above the projection 244. Thus, the inwardly extending projection 244 provides a barrier preventing the removal of the outwardly extending projections 268 from the channel 246 thereby maintaining the top cover 60 in engagement with the inner body 42. In this manner, the outwardly extending projections 268 of the fingers 266 snap into the channel 246 above the projection 244 to securely attach the top cover 60 to the top segment 260-1 of the inner body 42.

Figure 10:
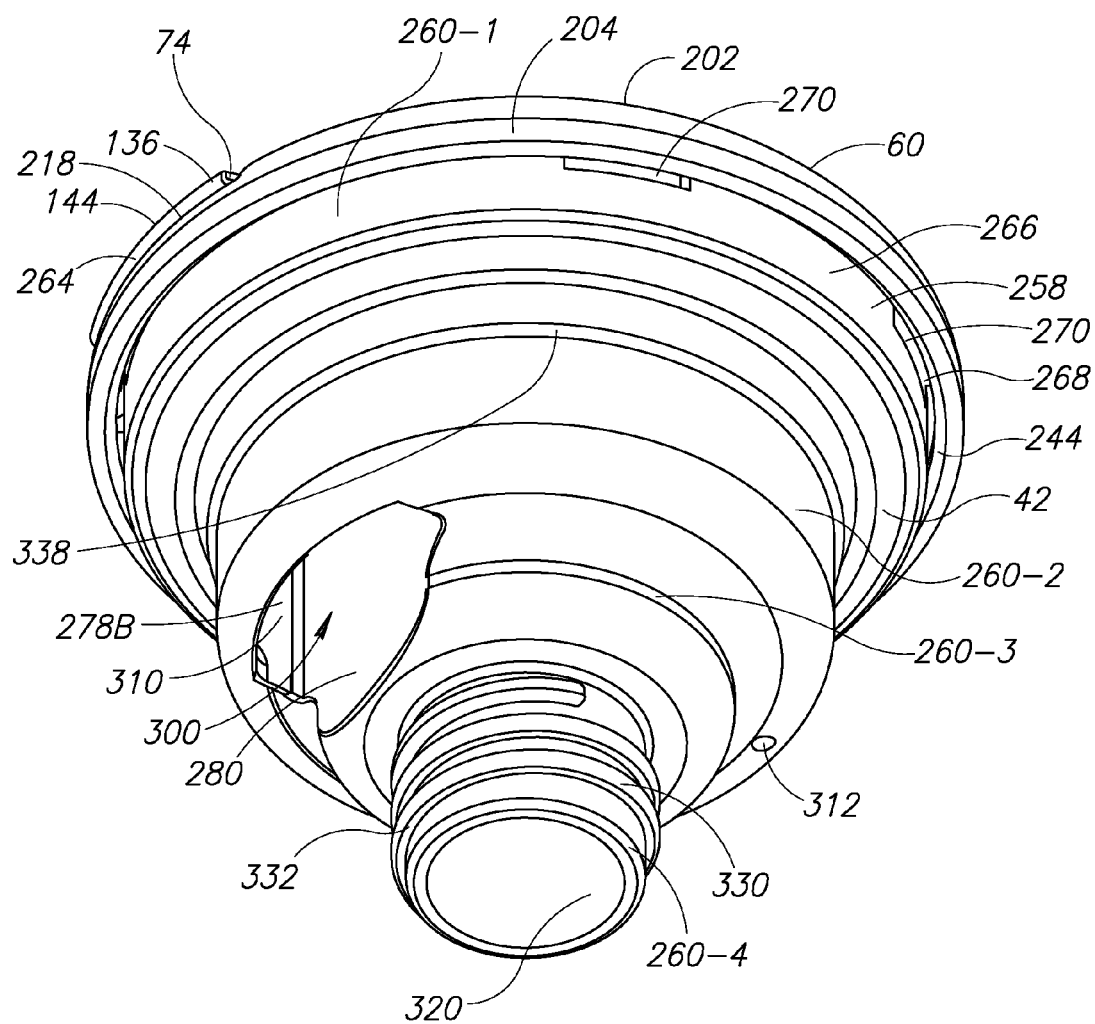
FIG. 10 is a perspective view a subassembly of the inner body, top cover, and lever member from below the pour spout of the inner body.

FIG. 10 illustrates a sub-assembly of the stopper 10 (see FIGS. 1-3) including the top cover 60 coupled to the inner body 42. As illustrated in FIG. 10, the outwardly radially extending projections 268 of the fingers 266 extend far enough way from the outer wall 258 of the inner body 42 to space the projection 244 and the sidewall 204 of the top cover 60 away from the outer wall 258 of the inner body 42, thereby permitting air to flow into the interior portion 256 (see FIGS. 8 and 9) through the interstices 270. Further, the interstices 270 may optionally extend along the outer wall 258 of the inner body 42 to a location below the inwardly extending projection 244 when the top cover 60 is coupled to the inner body 42, allowing air to flow into the interstices 270.

Referring to FIGS. 2 and 3, when the inner body 42 is nested inside the outer body 40, the interstices 270 (see FIGS. 8 and 9) are in open communication with the interior portion 36 (see FIGS. 2 and 3) defined at least in part by an outer body 40. In the embodiment illustrated, the interstices 270 (see FIGS. 8 and 9) are in open communication with a portion 271 of the interior portion 36 located above the annular sealing member 43 (see FIGS. 2 and 3). Air may flow between the top cover 60 and the outer body 40 from the environment outside the stopper 10 into the portion 271 of the interior portion 36 of the stopper 10.

Returning to FIGS. 8 and 9, to help maintain the top cover 60 (see FIG. 6) in proper alignment with the inner body 42, one of the interstices 270, an interstice 270A, is configured to receive the radially extending guide member 248 (see FIG. 7) of the top cover 60 and limit its circumferential movement relative to the inner body 42.

Inside the interior portion 256, a first shoulder 274-1 is provided at the intersection of the top segment 260-1 and the first middle segment 260-2, a second shoulder 274-2 is provided at the intersection of the first middle segment 260-2 and the second middle segment 260-3, and a third shoulder 274-3 is provided at the intersection of the second middle segment 260-3 and the bottom segment 260-4.

Inside the interior portion 256, the inner body 42 includes a pair of spaced apart upright support walls 278A and 278B flanking the pour spout 264 of the top segment 260-1 and an upright transverse dividing wall 280 extending between the upright support walls 278A and 278B. The upright support walls 278A and 278B and the upright transverse dividing wall 280 extend upwardly from the third shoulder 274-3 and terminate in the top segment 260-1.

The upright support walls 278A and 278B each have a lever support section 282A and 282B, respectively, and an air flow section 284A and 284B, respectively. The lever support sections 282A and 282B each have a flap support portion 286A and 286B, respectively, and a pivot pin support portion 288A and 288B, respectively. The flap support portions 286A and 286B are separated from the pivot pin support portions 288A and 288B by the dividing wall 280. The flap support portions 286A and 286B extend along opposite sides of the pour spout 264 and terminate at the dividing wall 280. Referring to FIGS. 2 and 4, when the stopper 10 is assembled and the lever member 74 is in the closed position, the underside 138 of the flap portion 136 of the lever member 74 rests upon the flap support portions 286A and 286B of the lever support sections 282A and 282B. The flap support portions 286A and 286B may be tapered from the dividing wall 286 to the pour spout 264, having thicker portions 290A and 290B, respectively, adjacent the pour spout 264.

As is apparent to those of ordinary skill in the art, the underside 138 of the flap portion 136 may form a liquid tight seal with the flap support portions 286A and 286B; however, this is not a requirement. Whether the contents of the container 12 (see FIGS. 1-3) flow through the stopper 10 is determined by whether the plug portion 54 of the valve member 48 is pressed against the annular seal 64 or spaced therefrom. Thus, the flap portion 136 may play no role in maintaining the contents of the container 12 therein. Therefore, a liquid tight seal need not be formed between the underside 138 of the flap portion 136 and the flap support portions 286A and 286B. Instead, the flap portion 136 may help prevent contaminants from entering the interior portion 36 of the stopper 10 through the first aperture 210 of the top cover 60.

Returning to FIGS. 8 and 9, the pivot pin support portion 288A of the upright support wall 278A has a notch 292A spaced from the dividing wall 280 and located near the center of the interior portion 256 of the inner body 42. Similarly, the pivot pin support portion 288B of the lever support section 282B of the upright support wall 278B has a notch 292B spaced from the dividing wall 280 and located near the center of the interior portion 256 of the inner body 42. Referring to FIG. 4, the notches 292A and 292B are configured to receive the first and second end portions 164A and 164B, respectively, of the transverse pivot pin 162 of the lever member 74. When the stopper 10 is assembled, the first and second end portions 164A and 164B of the transverse pivot pin 162 reside inside the notches 292A and 292B, respectively, and pivot therein relative to the inner body 42.

Returning to FIGS. 8 and 9, in the embodiment illustrated, the lever support sections 282A and 282B extends upwardly into the top segment 260-1 further than the air flow sections 284A and 284B. Thus, air flow gaps 296A and 296B are defined between the top cover 60 (see FIG. 4) and the air flow sections 284A and 284B, respectively. Further, the air flow sections 284A and 284B may not contact the outer wall 258 within the top segment 260-1 above the first shoulder 274-1, thereby defining a first gap 298A between the air flow section 284A and the outer wall 258 above the first shoulder 274-1 and a second gap 298B between the air flow section 284B and the outer wall 258 above the first shoulder 274-1.

The upright support walls 278A and 278B divide the interior portion 256 into three regions "R1," "R2," and "R3." Within the first and second middle segments 260-2 and 260-3, the three regions "R1," "R2," and "R3" are separated from one another by the upright support walls 278A and 278B. However, within the top segment 260-1, the three regions "R1," "R2," and "R3" are in communication with one another via the air flow gaps 296A and 296B defined between the top cover 60 (see FIG. 4) and the lever support sections 282A and 282B and the gaps 298A and 298B (see FIG. 15) between the air flow sections 284A and 284B and the outer wall 258. The regions "R1," and "R3," flank the "R2" and are essentially voids for storing air received from the environment outside the stopper 10 (see FIGS. 1-3) via the interstices 270.

The dividing wall 280 bifurcates the region "R2" of the interior portion 256 of the inner body 42 into a fluid flow channel 300 and a valve housing portion 306. A first aperture 310 is formed in the second shoulder 274-2 within the fluid flow channel 300 portion of the region "R2" of the interior portion 256 of the inner body 42. In the embodiment illustrated, the first aperture 310 extends into the second middle segment 260-3 and the third shoulder 274-3. The flap support portion 286A and 286B of the lever support sections 282A and 282B, respectively, of the upright support walls 278A and 278B, respectively, are adjacent the fluid flow channel 300 of the region "R2."

The pivot pin support portion 288A and 288B of the lever support sections 282A and 282B, respectively, of the upright support walls 278A and 278B, respectively, are adjacent the valve housing portion 306 of the region "R2." The air flow section 284A and 284B of the upright support walls 278A and 278B, respectively, are adjacent the valve housing portion 306 of the region "R2." Thus, air is allowed to flow into the valve housing portion 306 through the air flow gaps 296A and 296B are defined between the top cover 60 (see FIG. 4) and the air flow sections 284A and 284B, respectively and the gaps 298A and 298B (see FIG. 15) between the air flow sections 284A and 284B and the outer wall 258.

A second aperture 312 is formed in the second shoulder 274-2 within the valve housing portion 306 of the region "R2" of the interior portion 256 of the inner body 42. The second aperture 312 permits air to flow from inside the region "R2" of the interior portion 256 of the inner body 42 into the outer body 40. When the valve assembly 44 is open, the air inside the outer body 40 may flow from the outer body 40 into the container 12. The flow of air through the stopper 10 (see FIGS. 1-3) into the container 12 (see FIGS. 1 and 2) allow the contents of the container 12 to flow more readily through the fluid flow channel 300 of the region "R2" when the stopper is open.

Returning to FIG. 2, when the stopper 10 is assembled and the lever member 74 is in the closed position, the guide follower portion 140 of the lever member 74 is positioned adjacent to the transverse dividing wall 280 between the upright support walls 278A and 278B (see FIGS. 8 and 9) and extends into the valve housing portion 306 (see FIGS. 8 and 9) of the region "R2." Further, the support platform 148 of the internal portion 132 of the lever member 74 extends into the valve housing portion 306 (see FIGS. 8 and 9) of the region "R2" when the lever member 74 is in both the open and closed positions.

The guide follower portion 140 is spaced from the transverse dividing wall 280 and the upright support walls 278A and 278B (see FIGS. 8 and 9) and does not typically contact these structures when transitioning between the open and closed positions. However, if sufficient laterally directed force is applied to the lever member 74, lateral and radial movement of the guide follower portion 140 of the lever member 74 may be constrained by the transverse dividing wall 280 and the upright support walls 278A and 278B (see FIGS. 8 and 9).

The valve housing portion 306 portion of the region "R2" of the interior portion 256 of the inner body 42 includes a centrally located valve housing 320 for at least a portion of the components of the valve assembly 44. In the embodiment illustrated, the valve housing 320 includes a generally cylindrically shaped sidewall 324 with a longitudinally extending guide groove 328 formed therein.

The bottom segment 260-4 of the outer wall 258 includes a connector portion 330 configured to removably couple the inner body 42 to the outer body 40 (see FIGS. 2 and 3). In the embodiment illustrated, the connector portion 330 has outside threads 332.

The first middle segment 260-2 of the outer wall 258 includes an outwardly and radially extending annular projection 338 configured to maintain the annular sealing member 43 (e.g., an O-ring) against the outer wall 258 of the inner body 42.

Outer Body

Figure 11:
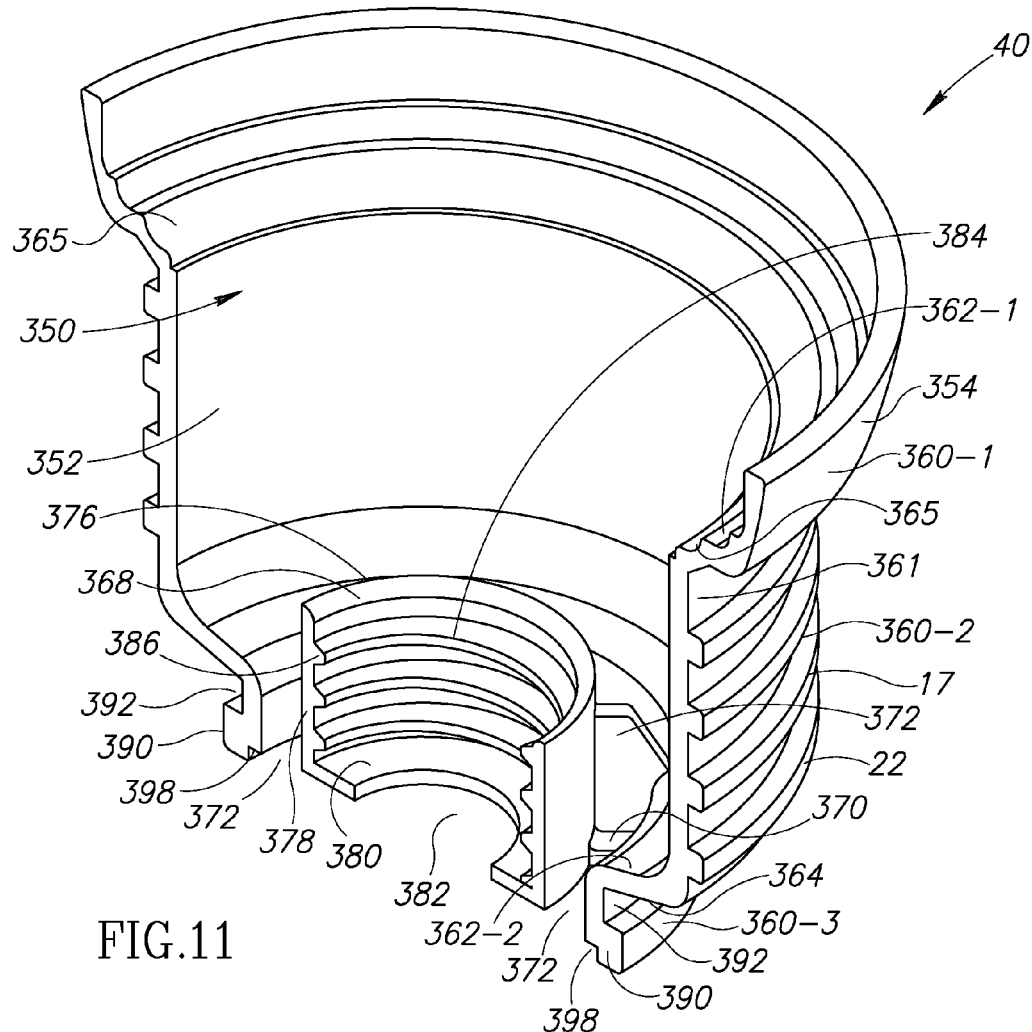
FIG. 11 is a perspective cross-sectional view of an outer body of the stopper of FIG. 1.

As illustrated in FIG. 11, the outer body 40 has an interior portion 350 defined by an inside surface 352 of an outer wall 354 having three segments: a top segment 360-1, a middle segment 360-2, and a bottom segment 360-3. The three segments 360-1, 360-2, and 360-3 each have a generally circular cross-sectional shape with diameters that decrease from section 360-1 to section 360-3. The outer wall 354 has an outside surface 361 opposite the inside surface 352.

The connector portion 17 (see FIGS. 1-3) of the stopper 10 is formed along the outside surface 361 of the middle segment 360-2 of the outer wall 354. As illustrated in FIG. 11, the outside threads 22 extend around the middle segment 360-2 of the outer wall 354.

Inside the interior portion 350, a first shoulder 362-1 is provided at the intersection of the top segment 360-1 and the middle segment 360-2, and a second shoulder 362-2 is provided at the intersection of the middle segment 360-2 and the bottom segment 360-3. Optionally, the first shoulder 362-1 includes an annular groove 365 configured to receive a portion of the annular sealing member 43 (see FIGS. 2-4) disposed on the outside wall 258 (see FIGS. 8 and 9) of the first middle segment 260-2 (see FIGS. 8 and 9) above the radially extending annular projection 338 (see FIGS. 8 and 9) of the inner body 42. As illustrated in FIGS. 2 and 3, when the inner body 42 is nested inside the outer body 40, the annular sealing member 43 (optionally received inside the annular groove 365 formed in the first shoulder 362-1) forms a liquid tight seal between the inner and outer bodies 42 and 40.

Returning to FIG. 11, opposite the second shoulder 362-2 formed inside the interior portion 350 of the outer body 40, a seal-engaging surface 364 is formed in the outside surface 361 of the outer wall 354 at the intersection of the middle segment 360-2 and the bottom segment 360-3. The seal-engaging surface 364 is configured to abut an upper face of the annular seal 64 (see FIGS. 2 and 3) when the stopper 10 is assembled.

The outer body 40 has an internal connector portion 368 located approximately centrally within the interior portion 350 of the outer body 40. The internal connector portion 368 extends upwardly from the bottom segment 360-3 into at least a portion of the middle segment 360-2. At least one radially extending connecting member 370 couples the internal connector portion 368 to the inside surface 352 of the outer wall 354 in the bottom segment 360-3. At least one opening 372 is formed in the connecting member 370 (or alternatively located between adjacent connecting members). The internal connector portion 368 is configured to be removably coupled to the connector portion 330 (see FIGS. 8 and 9) of the bottom segment 260-4 of the outer wall 258 of the inner body 42.

In the embodiment illustrated, the internal connector portion 368 of the outer body 40 is generally cylindrically shaped having an open top end portion 376 of a continuous sidewall 378. The internal connector portion 368 may have a partially closed bottom end portion 380 with a substantially centrally located through-hole 382 formed therein. The sidewall 378 has an inside surface 384 with inside threads 386 disposed thereon and configured to engage and threadedly mate with the outside threads 332 (see FIGS. 8 and 9) of the connector portion 330 of the inner body 42.

The bottom segment 360-3 of the outer wall 354 includes an outwardly and radially projecting lower portion 390 configured to extend into a recessed portion of the annular seal 64 (see FIGS. 8 and 9) to hold the annular seal 64 on the bottom segment 360-3 of the outer wall 354 of the outer body 40. Above the projecting lower portion 390, a channel 392 is defined between the projecting lower portion 390 and the seal-engaging surface 364 adjacent the middle segment 360-2. The inside surface 352 of the bottom segment 360-3 includes a lower recessed portion 398.

Annular Seal

Referring to FIGS. 11 and 12, the annular seal 64 is configured to be coupled to the bottom segment 360-3 of the outer wall 354 of the outer body 40 and to form a liquid tight seal between the outer body 40 and the plug portion 54 (see FIG. 2) of the valve member 48 when the stopper 10 is in the closed configuration (illustrated in FIGS. 1 and 2). The annular seal 64 has an annular body portion 400 constructed from rubber, rubber, resilient plastic, elastomers, any other suitable material known in the art, combinations thereof, and the like. The annular body portion 400 defines a generally circular central opening 402. The annular body portion 400 has an upper surface 404 configured to engage the seal-engaging surface 364 (see FIG. 11) of the outer body 40 to form a liquid tight seal therewith when the stopper 10 (see FIGS. 1-3) is assembled.

Below its upper surface 404, the annular body portion 400 has an inwardly and radially extending projection 408 configured to be received inside the channel 392 (see FIG. 11) defined between the projecting lower portion 390 (see FIG. 11) and the seal-engaging surface 364 (see FIG. 11) of the outer body 40. Below the projection 408, the annular seal 64 has an open generally U-shaped channel 410 configured to receive the projecting lower portion 390 (see FIG. 11) of the outer body 40. The channel 410 is defined by the projection 408, a downwardly extending sidewall 414, and an inwardly extending lower sealing portion 416 having a lower surface 418.

The lower surface 418 engages and forms a liquid tight seal with the plug portion 54 (see FIG. 2) of the valve member 48 when the stopper 10 is in the closed configuration (illustrated in FIGS. 1 and 2). A downwardly extending sealing projection 420 is formed along the lower surface 418 of the lower sealing portion 416. In the embodiment illustrated, the sealing projection 420 is annular, concentric with the annular body portion 400, and extends continuously around the outside surface 418 of the sealing portion 416. The sealing projection 420 bears against and may be compressed by the plug portion 54 (see FIG. 2) of the valve member 48 when the stopper 10 is in the closed configuration (illustrated in FIGS. 1 and 2) to provide a liquid tight seal between the annular seal 64 and the plug portion 54 (see FIG. 2).

The inwardly extending lower sealing portion 416 is terminated by an upwardly extending gripping projection 424 configured to be received inside the lower recessed portion 398 (see FIG. 11) of the bottom segment 360-3 of the outer wall 354 of the outer body 40. Thus, the annular body portion 400 wraps around and encases the outside surface 361 of the bottom segment 360-3 (see FIG. 11) and a portion of the inside surface 352 of the outer wall 354 of the outer body 40 to hold the annular seal 64 securely on the outer body 40.

Referring to FIGS. 1 and 2, the annular body portion 400 has an outer sealing portion 430 configured to engage the inwardly extending sealing member 21 located below the threads 18 of the rim portion 16 of the container 12. In the embodiment illustrated in FIG. 12, the outer sealing portion 430 is spaced from and extends along the downwardly extending sidewall 414 defining a channel 432 therebetween. The outer sealing portion 430 is coupled to the downwardly extending sidewall 414 adjacent the inwardly and radially extending projection 408 by an inwardly extending portion 434. The channel 432 is open along its bottom portion 436 opposite the inwardly extending portion 434. The outer sealing portion 430 deflects into the channel 432 when inwardly directed forces are applied to the outer sealing portion 430 by the inwardly extending sealing member 21 (see FIGS. 1 and 2) of the container 12 but has sufficient resiliency to maintain a liquid tight seal therewith.

Valve Assembly

The components of an exemplary implementation of the valve assembly 44 and the lever member 74 are illustrated in FIGS. 13 and 14. The valve assembly 44 includes the valve member 48, a link member 510 having the cam surface 200 formed thereon, a washer or cap 514, a biasing member 516 (e.g., a coil spring), and a collar 518. In the implementation illustrated, the valve assembly 44 is a poppet type valve opened by the action of a cam (i.e., the cam follower portion 160 of the lever member 74) and closed by the action of the biasing member 516.

As mentioned above, the valve member 48 includes the shaft portion 50 and the plug portion 54, the shaft portion 50 being substantially orthogonal to the plug portion 54 and centrally located. Opposite the plug portion 54 and on its proximal end 52, the shaft portion 50 includes a connector portion 520 having a cone-shaped key member 524 disposed above an annular circumferential groove 528 extending around the proximal end 52 of the shaft portion.

The collar 518 is configured to be disposed about the shaft portion 50 of the valve member 48 between the connector portion 520 and the distal end 56 coupled to the plug portion 54. The substantially centrally located through-hole 382 (see FIG. 11) formed in the partially closed bottom end portion 380 of the internal connector portion 368 of the outer body 40 is configured to receive the shaft portion 50 of the valve member 48 and permit it to travel therethrough. However, the through-hole 382 (see FIG. 11) is not large enough to permit the collar 518 to pass therethrough.

In the embodiment illustrated, the collar 518 has an upright open-ended hollow cylindrical section 534 having a sidewall 535 with an upper portion 536 opposite a lower portion 537 and a base portion 538 coupled to the lower portion 537 of the hollow cylindrical section 534. The base portion 538 has a bottom inside surface 540 and an upwardly extending sidewall 544 spaced from the sidewall 535 of the hollow cylindrical section 534 and extending upwardly from the bottom inside surface 540 along the lower portion 537 of the sidewall 535 of the hollow cylindrical section 534.

In the embodiment illustrated, the biasing member 516 is implemented as a coil spring 550 having an upper end portion 554 opposite a lower end portion 556. The biasing member 516 is configured to be disposed about the hollow cylindrical section 534 with its lower end portion 556 resting on the bottom inside surface 540 of the base portion 538. The sidewall 544 of the base portion 538 retains the lower end portion 556 of the biasing member 516 in proper alignment with respect to the valve member 48 and prevents the lower end portion 556 from gaining entry into the through-hole 382 (see FIG. 11) formed in the partially closed bottom end portion 380 of the internal connector portion 368 of the outer body 40. The biasing member 516 may extend beyond the collar 518 to extend along a portion of the shaft portion 50 of the valve member 48 below the annular groove 528 (illustrated in FIGS. 2 and 3).

The cap 514 may be generally disk-shaping having an upper platform 562 with a top side 563 opposite an underside 564 and sidewall 566 extending circumferentially along and downwardly from the platform 562. The upper platform 562 has a connector portion 568 with a keyway portion 570 configured to receive and retain the cone-shaped key member 524 of the shaft portion 50 of the valve member 48. One or more slots 272 may intersect with and extend from the keyway portion 570 to allow the upper platform 562 to flex to allow the keyway portion 570 to receive the cone-shaped key member 524 of the valve member 48. After the key member 524 passes through the keyway portion 570, portions 580 of the upper platform 562 along the keyway portion 570 are received inside the annular groove 528 below the key member 524 and maintain the cap 514 on the shaft portion 50 of the valve member 48. Thus, the key member 524 and the keyway portion 570 may snap together to form a snap fit.

Referring to FIGS. 2 and 3, when the stopper 10 is assembled, the upper end portion 554 of the coil spring 550 abuts the underside 564 of the upper platform 562 and is surrounded by the downwardly extending sidewall 566. Thus, the coil spring 550 is confined between the underside 564 of the upper platform 562 of the cap 514 and the bottom inside surface 540 of the base portion 538 of the collar 518.

Returning to FIGS. 13 and 14, the link member 510 is configured to engage the top side 563 of the cap 514 when the cap is inside the valve housing 320 (see FIGS. 2 and 3). The link member 510 includes the cam surface 200 disposed on a closed upper end portion 578 of an upright hollow cylindrical section 582 having a sidewall 584 extending downwardly from the closed upper end portion 578 and an open lower portion 586 opposite the closed upper end portion 578. When the stopper 10 is assembled, the open lower portion 586 abuts the top side 563 of the cap 514 to transfer any downwardly directed forces applied to the link member 510 to the cap 514.

The cam follower portion 160 of the lever member 74 bears against the cam surface 200 of the link member 510 when the lever member is pivoted from the closed position (see FIGS. 1 and 2) to the open position (see FIG. 3).

The cam surface 200 includes a relieved portion 590. When the pushbutton 70 is depressed, the cam follower portion 160 of the lever member 74 travels along the cam surface 200 toward the relieved portion 590. The lever member 74 is fully in the open position (see FIG. 3), when the cam follower portion 160 is fully received inside the relieved portion 590. The relieved portion 590 is configured to maintain the lever member 74 in the fully open position until sufficient downward force is applied to the flap portion 136 of the lever member 74 to force the cam follower portion 160 from the relieved portion 590.

Referring to FIGS. 2 and 3, the cap 514, the collar 518, the link member 510, and the biasing member 516 are suitably sized and shaped to move (e.g., slide) within the valve housing 320 of the inner body 42 when the inner body 42 is coupled to the outer body 40. The valve housing 320 helps guide and limit the travel path of the cap 514 within the interior portion 36 of the stopper 10.

Referring to FIGS. 14 and 15, the link member 510 includes a key projection 594 extending along the sidewall 584 of the cylindrical section 582 between the closed end portion 578 and the open end portion 586. The key projection 594 is configured to be received inside the guide groove 328 of the sidewall 324 of the valve housing 320 and slide therein along at least a portion of the length of the guide groove. Engagement between the key projection 594 and the guide groove 328 ensures the cam surface 200 is oriented properly relative to the cam follower portion 160 of the lever member 74 for proper engagement therebetween.

Fluid and Air Flow

Referring to FIG. 3, when the stopper 10 is in the open position, the contents of the container 12 (see FIGS. 1 and 2) may flow from the interior portion 15 (see FIGS. 1 and 2) of the container through the fluid flow channel 300. First, the contents of the container 12 (see FIGS. 1 and 2) enter the outer body 40 through the opening(s) 372. Then, the contents enter the fluid flow channel 300 via the first aperture 310. Next, the contents flow through the fluid flow channel 300 toward the pour spout 264 and exit the fluid flow channel 300 through the first aperture 210 guided by the pour spout 264.

At the same time, air may flow into the interior portion 15 (see FIGS. 1 and 2) of the container 12 (see FIGS. 1 and 2) through the valve housing portion 306. As explained above, air flows between the top cover 60 and the outer body 40 into a portion 271 (see FIGS. 2 and 3) of the interior portion 36 located above the annular sealing member 43 (see FIGS. 2 and 3). Turning to FIG. 8, air flows into the regions "R1" and "R3" of the interior portion 256 of inner body 42 through the interstices 270. Optionally, air may flow into the valve housing portion 306 of the region "R2" of the interior portion 256 of inner body 42 through the interstice 270A. Air then flows from the regions "R1" and "R3" into the valve housing portion 306 of the region "R2" via the air flow gaps 296A and 296B, and air flow gaps 298A and 298B (see FIG. 15). Returning to FIG. 3, the air flows through the second aperture 312 into the outer body 40. Finally, air may enter the interior portion 15 (see FIGS. 1 and 2) of the container 12 (see FIGS. 1 and 2) through the opening(s) 372.

Referring to FIG. 2, when the stopper 10 is in the closed position, the contents of the container 12 are maintained within the interior portion 15 of the container by a liquid tight seal formed between the annular seal 64 and the plug portion 54 of the valve member 48. The plug portion 54 of the valve member 48 bears against the lower surface 418 of the annular seal 64 preventing the contents of the container 12 from entering the outer body 40 through the opening(s) 372. Air flow into the container 12 is also prevented by the seal formed between the annular seal 64 and the plug portion 54 of the valve member 48. In the embodiment illustrated, the downwardly extending sealing projection 420 formed along the lower surface 418 of the lower sealing portion 416 also engages the plug portion 54 to form a liquid tight seal therewith.

Assembly

Referring to FIG. 2, a method of assembling and disassembling the stopper 10 will now be described. First, the annular seal 64 maybe coupled to the bottom segment 360-3 of the outer wall 354 of the outer body 40. Then, the shaft portion 50 of the valve member 48 is inserted upwardly into the centrally located through-hole 382 (see FIG. 11) of the bottom end portion 380 (see FIG. 11) of the internal connector portion 368 of the outer body 40.

Next, the collar 518 is disposed about the shaft portion 50 of the valve member 48 between the connector portion 520 and the distal end 56 coupled to the plug portion 54. Optionally, the collar 518 may rest upon partially closed bottom end portion 380 (see FIG. 11) of the internal connector portion 368 of the outer body 40 or alternately be disposed inside the through-hole 382 (see FIG. 11). However, as mentioned above, the through-hole 382 (see FIG. 11) is not large enough to permit the collar 518 to pass therethrough.

Next, the biasing member 516 is disposed around the collar 518 with its lower end portion 556 resting on the bottom inside surface 540 of the base portion 538. Then, the cone-shaped key member 524 (see FIG. 13) of the shaft portion 50 of the valve member 48 is inserted in the keyway portion 570 (see FIG. 13) of the cap 514 and the portions 580 (see FIG. 13) of the upper platform 562 along the keyway portion 570 are received inside the annular groove 528 below the key member 524 (see FIG. 13) to maintain the cap 514 on the shaft portion 50 of the valve member 48. The biasing member 516 abuts the underside 564 of the upper platform 562 and is surrounded by the downwardly extending sidewall 566 of the cap 514. Thus, the biasing member 516 may be confined between the underside 564 of the upper platform 562 of the cap 514 and the bottom inside surface 540 of the base portion 538 of the collar 518.

At some point, the annular sealing member 43 (e.g., an o-ring) is disposed about the first middle segment 260-2 of the outer wall 258 of the inner body 42 above the outwardly and radially extending annular projection 338. Then, the inner body 42 is nested inside the outer body 40. As the inner body 42 is inserted into the outer body 40, the shaft portion 50 of the valve member 48 with the collar 518, the biasing member 516, and the cap 514 disposed thereon is inserted into the valve housing 320 of the inner body 42. Then, the connector portion 330 of the inner body 42 is coupled to the internal connector portion 368 of the outer body 40 by rotating at least one of the inner body 42 and outer body 40 relative to the other to engage the outside threads 332 of the connector portion 330 with the inside threads 386 (see FIG. 11) of the internal connector portion 368.

The link member 510 is inserted into the valve housing 320 of the inner body 42 with its key projection 594 inserted into the inside the guide groove 328 of the sidewall 324 of the valve housing 320 to properly orient the cam surface 200 of the link member 510 relative to the inner body 42. After being inserted into the valve housing 320, the link member 510 rests upon the cap 514 disposed therein.

At some point, the lever member 74 and the pushbutton 70 are assembled together by coupling the connector portion 170 of the lever member 74 to the connector portions 106A and 106B couple the pushbutton 70. Then, referring to FIG. 3, the first and second end portions 164A and 164B (see FIG. 5) of the transverse pivot pin 162 are inserted into the notches 225A and 225B (see FIG. 7) of the guide walls 224A and 224B of the top cover 60 with the bottom portion 104 of the sidewall 108 of the pushbutton 70 placed adjacent to the shelf portion 230 of the top cover 60. Next, the top cover 60 is affixed to the upper portion 262 (see FIG. 8) of the top segment 260-1 (see FIG. 8) of the inner body 42. First, the flap portion 136 of the lever member 74 is rotated upwardly away from the first aperture 210, and then the pour spout 264 is carefully positioned within the relieved portion 218 of the first aperture 210.

Next, the outwardly and radially extending projections 268 (see FIG. 8) of the fingers 266 (see FIG. 8) are inserted into the channel 246 (see FIG. 6) above the projection 244 (see FIG. 6). As this occurs, the transverse pivot pin 162 of the lever member 74 is seated in the notches 292A and 292B (see FIG. 8) of the inner body 42. The flap portion 136 is also positioned to rest upon the flap support portion 286A and 286B (see FIG. 8) of the upright support walls 278A and 278B (see FIG. 8) flanking the pour spout 264.

To clean the stopper 10, its components are disassembled. The stopper 10 may be disassembled by simply reversing the assembly method described above. First, the top cover 60 is removed. Then, the lever member 74 and pushbutton 70 are removed. Next, the inner body 42 is removed from the outer body 40 and optionally, the annular sealing member 43 is removed from the inner body 42. The link member 510 is removed from the valve housing 320. Next, the cap 514 is separated from the shaft portion 50 of the valve member 48 allowing the collar 518 and the biasing member 516 to be removed from the outer body 40. Removing the cap 514 also allows the valve member 48 to be removed from the outer body 40. Finally, the annular seal 64 may be removed from the outer body 40.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A stopper comprising:
    a support shell defining an interior portion having an open-ended fluid flow channel extending between an inlet and an outlet,
    a valve housing disposed inside the interior portion and having an opening adjacent the inlet of the fluid flow channel; and
    a valve assembly at least partially disposed inside the valve housing comprising:
    a movable valve member having an elongated shaft extending from inside the valve housing through the opening to outside the support shell, the elongated shaft having an interior portion inside the valve housing and an exterior portion outside the support shell coupled to a plug adjacent the inlet of the fluid flow channel;
    a biasing member disposed within the valve housing and connected to the interior portion of the elongated shaft;
    a lever member pivotably mounted to the support shell to pivot between an closed position and an open position, the lever member having a cam follower; and
    a link member having a contoured cam surface, the link member being connected to the interior portion of the elongated shaft, the cam surface being adjacent the cam follower of the lever member and contoured to move the link member toward the opening in the valve housing when the cam follower is pivoted from the closed position to the open position, and move the interior portion of the elongated shaft toward the opening in the valve housing and position the plug away from the inlet of the fluid flow channel and out of sealing engagement therewith, the cam surface being further contoured to allow the biasing member to move the link member away from the opening in the valve housing when the cam follower is pivoted from the open position to the closed position and move the interior portion of the elongated shaft away from the opening in the valve housing and position the plug in sealing engagement with inlet of the fluid flow channel.

2. The stopper of claim 1, wherein the valve housing has a guide groove formed therein and the link member has a projection configured to be slidably received inside the guide groove and when orient the cam surface relative to the cam follower.

3. The stopper of claim 1, wherein the support shell comprises at least one air flow channel in communication with the inlet of the fluid flow channel.

4. The stopper of claim 1, wherein the inlet of the fluid flow channel comprises a perimeter portion and the stopper further comprises a sealing member disposed about the perimeter portion of the inlet configured to form a substantially liquid tight seal between the inlet and the plug when the cam follower is pivoted to the closed position to position the plug in sealing engagement with the inlet.

5. The stopper of claim 1, wherein the support shell comprises an inner body nested inside an outer body,
    the inner body comprises a threaded cylindrical connector portion,
    the outer body comprises a threaded cylindrical connector portion,
    the inner body is couplable to the outer body by a threaded engagement of the threaded cylindrical connector portion of the inner body with the threaded cylindrical connector portion of the outer body, and
    when threadedly engaged, the threaded cylindrical connector portion of the inner body and the threaded cylindrical connector portion of the outer body together form the valve housing.

6. The stopper of claim 1, wherein the contoured cam surface comprises a relieved portion, the cam follower being positioned within the relieved portion when the lever member is in the open position, the relieved portion retaining the cam follower and maintaining the lever member in the open position.

7. The stopper of claim 6, wherein the lever member comprises a flap portion extending upwardly from the support shell when the lever member is in the open position, the lever member being pivotable from the open position to the closed position by a downward force applied to the flap portion sufficient to dislodge the cam follower from the relieved portion of the contoured cam surface.

8. The stopper of claim 1, wherein the support shell comprises an inner body nested inside an outer body,
the inner body has a pair of spaced apart walls flanking the valve housing, each of the walls having a notch, and
the lever member comprises a pivot pin having opposing ends received one each in the notches of the spaced apart walls of the inner body flanking the valve housing.

9. The stopper of claim 8, wherein the inner body comprises an outside surface,
the outer body comprises an inside surface, and
the support shell comprises a sealing member disposed between the outside surface of the inner body and the inside surface of the outer body.

10. The stopper of claim 1, wherein the support shell comprises a top portion having a exit aperture adjacent the outlet of the fluid flow channel and the lever member comprises a flap portion, the flap portion covering the exit aperture when the lever member is in the closed position and being spaced from the exit aperture when the lever member is in the open position.

11. The stopper of claim 10, wherein the support shell comprises a pour spout adjacent the exit aperture and the flap portion comprises a distal edge portion resting on a portion of the pour spout when the lever member is in the closed position.

12. The stopper of claim 1 for use by a user, the stopper further comprising:
a manually operated pushbutton coupled to the lever member transitionable between an open position and a closed position along a substantially linear path of travel, the pushbutton being selectively depressible by the user into the open position, and when depressed, the pushbutton pivoting the lever member into the open position.

13. The stopper of claim 12, wherein the lever member comprises a flap portion extending upwardly from the support shell when the lever member is in the open position, the flap portion being selectively rotatable toward the support shell by the user, and when so rotated, the flap portion pivoting the lever member into the closed position and moving the manually operated pushbutton along its substantially linear path of travel into the closed position.

14. The stopper of claim 13, wherein the lever member further comprises a pivot pin spaced from the cam follower, the manually operated pushbutton comprises a pair of spaced apart slots extending along a direction substantially orthogonal to the substantially linear path of travel of the manually operated pushbutton, the manually operated pushbutton being coupled to the lever member by the pivot pin being received inside the space apart slots of the manually operated pushbutton, the pivot pin being pivotably and slidably mounted therein such that when the manually operated pushbutton is depressed by the user into the open position the pivot pin pivots and slides within the slots.

15. A stopper for use with a container having a hollow interior portion for storing contents, the container further comprising an opening in communication with the hollow interior of the container through which the contents may exit the hollow interior portion of the container, the stopper comprising:
a coupler portion removably couplable to the opening of the container;
an externally accessible first portion having an exit aperture, at least one air inlet, and a manually depressible pushbutton;
a second portion having an inlet aperture in communication with the hollow interior portion of the container when the coupler portion is coupled to the opening of the container;
an internal fluid flow channel extending between the inlet aperture and the exit aperture;
at least one air flow pathway extending between the at least one air inlet of the externally accessible first portion and the inlet aperture, the at least one air flow pathway providing air to the hollow interior portion of the container to replace at least a portion of the contents that exit therefrom through the inlet aperture, internal fluid flow channel, and the exit aperture of the externally accessible first portion;
a valve member movable relative to the inlet aperture and having a plug portion adjacent the inlet aperture sized and shaped to prevent the flow of the contents of the container into the inlet aperture when the plug portion is moved against the second portion;
a biasing member coupled to the valve member, the biasing member being configured to exert a biasing force on the valve member in a first direction sufficient to bias the plug portion against the second portion and prevent the contents of the container from flowing into the inlet aperture,
a valve opening assembly coupled between the manually depressible pushbutton and the valve member, the valve opening assembly being configured to exert a moving force on the valve member in a second direction opposite the first direction sufficient to overcome the biasing force exerted by the biasing member in the first direction and space the plug portion from the second portion to allow the contents of the container to flow into the inlet aperture when the manually depressible pushbutton is depressed.

16. The stopper of claim 15, wherein the valve opening assembly comprises a lock configured to selectively lock the manually depressible pushbutton in an open position and the plug portion in an open position at a predetermined distance from the second portion to allow the contents of the container to flow into the inlet aperture.

17. The stopper of claim 15, wherein the second portion comprises a sealing member configured to provide a substantially liquid tight seal between the second portion and the plug portion when the plug portion is moved against the second portion.

18. The stopper of claim 15, wherein the valve member comprises a shaft portion with a proximal end portion connected to the manually depressible pushbutton by the valve opening assembly and a distal end portion coupled to the plug portion, the shaft portion positioning the plug portion adjacent to the inlet aperture.

19. The stopper of claim 18, wherein the valve opening assembly comprises a cam surface coupled to the proximal end portion of the shaft portion of the valve member and a cam follower coupled to the manually depressible pushbutton,
the manually depressible pushbutton translating an inwardly directed force to the cam follower when the manually depressible pushbutton is depressed,
the cam follower being pressed against the cam surface by the inwardly directed force and translating at least a portion of the inwardly directed force to the cam surface,
the cam surface translating the portion of the inwardly directed force into the moving force on the valve member in the second direction and exerting the biasing force in the second direction on the proximal end portion of the shaft portion of the valve member.

20. The stopper of claim 19, wherein the cam follower is coupled to a pivot pin and is configured to pivot about the pivot pin, and
when the manually depressible pushbutton translates the inwardly directed force to the cam follower, the cam follower pivots about the pivot pin as it is pressed against the cam surface by the inwardly directed force.

21. A stopper for use with a container having a rim portion defining an opening in the container, the stopper comprising:
an outer body having a substantially hollow central portion defined by a sidewall having a lower portion with a bottom opening, the sidewall being removably couplable to the rim portion of the container, the outer body further comprising a coupler portion located inside the central portion of the substantially hollow interior adjacent the lower portion of the sidewall;
an inner body having a top portion and an interior portion divided into a fluid flow channel and a valve housing, the inner body being configured to nest inside the hollow central portion of the outer body and further comprising a coupler portion configured to be removably coupled to the coupler portion of the outer body;
a top cover coupled to the top portion of the inner body and comprising a first aperture in communication with the fluid flow channel of the inner body and a second aperture spaced from the first aperture;
an annular sealing member disposed about the lower portion of the sidewall of the outer body and extending around the bottom opening;
a valve assembly having a movable valve member with a shaft portion and an external plug portion external to the outer body and adjacent the annular sealing member, the shaft portion extending from inside the valve housing through the bottom opening in the outer body to the external plug portion, the valve assembly further comprising a cam surface coupled to a biasing member inside the valve housing, the biasing member having a first portion disposed inside the internal coupler and a second portion connected to the shaft portion, the biasing member exerting an inwardly directed biasing force on the shaft portion biasing the shaft portion inwardly, the biasing force being sufficient to bias the external plug portion against the annular sealing member;
a lever member pivotably coupled to the inner body and having a movable flap portion extending outwardly through the first aperture in the top cover and a cam follower positioned inside the inner body adjacent the cam surface of the valve assembly;
a manually operable pushbutton disposed inside the second aperture of the top cover and coupled to the lever member, the pushbutton being depressible into an open position and when depressed into the open position, pivoting the lever member to move the flap portion away from the first aperture and the fluid flow channel and to move the cam follower along the cam surface with a sufficient outwardly directed force to overcome the inwardly directed biasing force exerted by the biasing member on the shaft portion, thereby spacing the external plug portion from the annular sealing member.

22. The stopper of claim 21 for use with a container having an annular sealing projection extending into the opening defined by the rim portion, the annular sealing member disposed about the lower portion of the sidewall of the outer body being configured to engage the annular sealing projection to form a substantially liquid tight seal therewith.

23. The stopper of claim 21, wherein the coupler portion of the inner body and the coupler portion of the outer body each comprise threads, the threads of the coupler portion of the inner body being configured to mate with the threads of the coupler portion of the outer body to removably couple the inner and outer bodies together, the inner body being rotatable relative to the outer body in a first direction to couple the threaded coupler portion of the inner body to the threaded coupler of the outer body, the inner body being further rotatable relative to the outer body in a second direction opposite the first direction to decouple the threaded coupler portion of the inner body from the threaded coupler of the outer body.

24. A thermos comprising:
a body with a hollow interior portion configured to store contents, the body comprising an opening in communication with the hollow interior through which the contents may exit the hollow interior portion; and
a stopper comprising:
a coupler portion selectively couplable to the body at the opening in communication with the hollow interior portion;
an external portion having an exit aperture, at least one air inlet, and a manually depressible pushbutton;
an internal portion adjacent the external portion and having an inlet aperture in communication with the hollow interior portion;
an internal fluid flow channel extending between the inlet aperture and the exit aperture;
at least one air flow pathway extending between the at least one air inlet of the external portion and the inlet aperture of the internal portion, the at least one air flow pathway providing air to the hollow interior portion to replace any contents that exit therefrom through the exit aperture of the external portion; and
a valve assembly operated by the manually depressible pushbutton, the valve assembly comprising:
a valve member movable relative to the inlet aperture and having a plug portion adjacent the inlet aperture sized and shaped to prevent the flow of the contents of the container into the inlet aperture when the plug portion is moved against the internal portion;
a biasing member coupled to the valve member and exerting a biasing force on the valve member in a first direction sufficient to bias the plug portion against the internal portion and prevent the contents of the container from flowing into the inlet aperture;
a cam surface opposing the biasing member; and
a cam follower disposed upon the cam surface and coupled to the manually depressible pushbutton, the cam follower being rotatable by the manually depressible pushbutton relative to the cam surface from a closed position to an open position and when so rotated, exerting a moving force on the cam surface in a second direction opposite the first direction sufficient to overcome the biasing force exerted by the biasing member on the valve member in the first direction and move the plug portion away from the internal portion to allow the contents of the container to flow into the inlet aperture.

25. The thermos of claim 24, wherein the cam surface comprises a recessed portion configured to retain the cam follower when the cam follower is rotated by the manually depressible pushbutton relative to the cam surface from the closed position to the open position and to maintain the cam follower in the open position.

26. The thermos of claim 24, wherein the valve member comprises a shaft portion with a proximal end portion connected to the biasing member and a distal end portion coupled to the plug portion, the shaft portion positioning the plug portion adjacent to the inlet aperture, the valve assembly further comprises a cap coupled to the proximal end portion of the shaft portion, the cap having a first surface facing the inlet aperture and a second surface facing opposite the first surface;

the biasing member comprises a first end portion adjacent to and bearing against the first surface of the cap, and the cam surface is adjacent to and bears against the second surface of the cap.

* * * * *